United States Patent [19]

Higuchi et al.

[11] Patent Number: 4,960,828
[45] Date of Patent: Oct. 2, 1990

[54] SCRATCH RESISTANT TOP COATING COMPOSITION

[75] Inventors: Tetsuo Higuchi, Aichi; Sachio Yamaguchi, Hiratsuka; You Sugimura, Odawara; Shinji Sugiura, Fujisawa; Shigeru Nakamura, Owariasahi, all of Japan

[73] Assignees: Kansai Paint Company, Limited, Amagasaki; Toyota Jidosha Kabushiki Kaisha, Toyota, both of Japan

[21] Appl. No.: 228,648

[22] Filed: Aug. 5, 1988

[30] Foreign Application Priority Data

Aug. 7, 1987 [JP] Japan ................................. 62-198903
Aug. 7, 1987 [JP] Japan ................................. 62-198904
Aug. 7, 1987 [JP] Japan ................................. 62-198905

[51] Int. Cl.$^5$ ......................... C08L 29/02; C08F 20/00
[52] U.S. Cl. ..................................... 525/162; 525/443
[58] Field of Search ............................... 525/162, 443

[56] References Cited

U.S. PATENT DOCUMENTS 4,397,989  8/1983  Adesko .................................. 525/162
4,681,815  7/1987  Rutkiewic et al. .................. 428/458
4,716,200 12/1987  Berghoff .............................. 525/111

*Primary Examiner*—John C. Bleutge
*Assistant Examiner*—Vasu S. Jagannathan
*Attorney, Agent, or Firm*—Armstrong, Nikaido, Marmelstein, Kubovcik & Murray

[57] ABSTRACT

A top coating composition comprising
(A) a polyol resin having a weight average molecular weight of 400 to 2,000 a ratio of weight average molecular weight ($\overline{M}w$) to number average molecular weight ($\overline{M}n$) of not more than 1.6, and a hydroxyl value of 150 to 400 mg KOH/g,
(B) at least one polyol resin selected from the group consisting of
  (1) a polyester polyol having a weight average molecular weight of 2,000 to 50,000, a hydroxyl value of 50 to 200 mg KOH/g, and cyclohexylene ring content of not less than 7 percent by weight,
  (2) an acrylic polyol resin containing 20 to 60 percent by weight of acrylic and/or methacrylic ester of a monohydric alcohol of 6 to 18 carbon atoms, and having a weight average molecular weight of 5,000 to 50,000 and a hydroxyl value of 50 to 180 mg KOH/g, and
  (3) a mixed polyol resin consisting of a non-aqueous dispersion type acrylic resin prepared by dispersion-polymerizing at least one vinyl monomer in the presence of a polymer dispersion stabilizer and an organic solvent, and a solution type acrylic polyol resin having a weight average molecular weight of 5,000 to 50,000 and a hydroxyl value of 50 to 180 mg KOH/g, and
(C) an alkoxy monomeric melamine, wherein (A) accounts for 15 to 60 percent, (B) for 15 to 60 percent, and (C) for 20 to 50 percent by weight based on the total weight of (A), (B) and (C).

8 Claims, No Drawings

SCRATCH RESISTANT TOP COATING COMPOSITION

The present invention relates to a novel top coating composition and, more particularly, to a top coating composition yielding a highly scratch-resistant film.

The top coat applied to the automotive plate is frequently scratched by collision with sand and dust particles in the course of a drive or by friction against car washer brushes, for instance, thus detracting from the finished appearance of the car. Such scratches are particularly prominent where the car is finished in deep colors such as black, deep blue, brown and so on. The methods for improving the scratch resistance of the coat include:

(a) The coat itself is hardened to a pencil hardness of 4H or higher so as to increase its abrasion resistance and, hence, scratch resistance.

(b) The coefficient of friction of the film surface is reduced for facilitating slippage of foreign bodies across the coated surface, thereby prevent formation of scratches.

(c) The abrasion load is transformed into an elastic deformation which can recover upon removal of the load, whereby the formation of scratches is precluded.

However, all of these methods have their own drawbacks. Thus, by method (a), it is not easy to provide a hard organic film having a pencil hardness of 4H or higher and even if a film is formed on the substrate surface, it is not sufficiently flexible and, because of the consequent large internal stress, tends to undergo cracking. By method (b), the surface coefficient of friction of the film can be easily reduced by adding a substance which will be disposed on the surface to reduce its coefficient of friction, but the film loses its scratch resistance as the substance is lost gradually from the film surface, thus leading to extremely poor lasting effect. Regarding the coating composition used in method (c), much research has been undertaken to this day but no satisfactory coating material for this method has been developed.

It is an object of the invention to provide a coating composition which can be used with advantage in method (c).

It is another object of the invention to provide a top coating composition capable of yielding a film with increased scratch resistance.

It is a further object of the invention to provide a top coating composition capable of yielding a film which is excellent in impact resistance, durability, flatness/smoothness, image sharpness, humidity resistance, waterproof, resistance to chemicals such as acids, weatherability and so on.

It is still another object of the invention to provide a coating composition which is cratering-free on application and assures a sophisticated finished appearance.

Other objects and advantageous features of the invention will become apparent from the following detailed description.

The present invention provides a top coating composition comprising:

(A) a low molecular weight polyol resin having a weight average molecular weight in the range of about 400 to about 2,000 with a molecular weight distribution in terms of the ratio of weight average molecular weight ($\overline{Mw}$) to number average molecular weight ($\overline{Mn}$) being not more than about 1.6, and having a hydroxyl value in the range of about 150 to about 400 mg KOH/g, (B) at least one polyol resin selected from the group consisting of (1) a polyester polyol resin having a weight average molecular weight of about 2,000 to about 50,000, a hydroxyl value of about 50 to about 200 mg KOH/g, and a cyclohexylene ring content not less than about 7 percent by weight, (2) an acrylic polyol resin containing about 20 to about 60 percent by weight, based on the total components of copolymer, of an acrylic and/or methacrylic ester of a monohydric alcohol of 6 to 18 carbon atoms and having a weight average molecular weight of about 5,000 to about 50,000 and a hydroxyl value of about 50 to about 180 mg KOH/g, and (3) a mixed polyol resin consisting of a non-aqueous dispersion-type acrylic resin prepared by dispersion-polymerizing at least one vinyl monomer in the presence of a polymer dispersion stabilizer and an organic solvent, and a solution type acrylic polyol resin having a weight average molecular weight of about 5,000 to about 50,000 and a hydroxyl value of about 50 to about 180 mg KOH/g, and (C) an alkoxy monomeric melamine, wherein (A) component accounts for about 15 to about 60 percent by weight, (B) component about 15 to about 60 percent by weight, and (C) component about 20 to about 50 percent by weight based on the total weight of (A) to (C) components.

In the present invention, the terms 'top coating composition' mean a coating material used to form a top coat and, as such, includes a top enamel finish, a clear finish to be applied on top of a cured base coat, a two-coat one-bake clear finish and so on.

The composition of the invention comprises the aforementioned (A), (B) and (C) components and can be used in any of the top-coat applications mentioned above. Particularly, a composition containing a polyester polyol resin (1) for (B) component is most suited in top enamel finish applications and a composition containing an acrylic polyol resin (2) or a mixed polyol resin consisting of a non-aqueous dispersion type acrylic resin and a solution type acrylic polyol resin (3) for (B) component is most suitable for use in top clear finish applications such as a clear finish to be applied on top of a cured base coat, a clear finish in a two-coat one-bake finish. The terms 'two-coat one-bake finish' are used herein to mean a finish obtainable by coating a substrate first with a pigment-containing thermosetting resin coating composition and then with a clear finish and subjecting the resulting uncured two-layer coat to heat curing simultaneously.

In the above coating composition of the present invention, said (A) component is low in molecular weight and has a narrow molecular weight distribution and (C) component is also low in molecular weight and virtually free of self-condensation. Therefore, the three-dimensional cured product of (A) and (C) components features a short distance of inter-crosslinking sites and forms a microscopically regular network, forming an elastic film with good recovery, with the result that the film responds as a elastomer to scratching loads, hence not undergoing destruction but absorbing the loads as elastic deformations and regaining its initial form upon release from the loads, being thus saved from damages.

However, the coat obtained exclusively with the aforesaid (A) and (C) components is not fully satisfactory in terms of performance as an automotive plate coat, such as acid resistance, impact resistance, image sharpness and so on and, for this reason, the aforesaid (B) component is incorporated within the range where the scratch resistance of the coat is not sacrificed.

Automotive plates finished in dark colors such as black, blue, green, red and so on have the disadvantage that when they are scratched by collision with sand and dust particles on the road or by friction against car washing machine brushes, the resulting injuries are comparatively prominent and, therefore, it has been common practice to avoid finishing them in such colors. However, owing to the diversification of car buyers' taste, demands for higher marketability, and an ever fiercer competition in the world market, coating design in such a color region as the industry avoided to use in the past has become essential.

The coating composition of this invention is excellent in scratch resistance and has neatly overcome the problem of scratching in coating color design, thus being of considerable technical significance.

The coating composition of the invention is described in further detail below.

The aforesaid (A) component is a low molecular weight polyol resin having a weight average molecular weight of about 400 to about 2,000, with a molecular weight distribution not more than about 1.6 in terms of $\overline{Mw}/\overline{Mn}$, wherein $\overline{Mw}$ stands for weight average molecular weight and $\overline{Mn}$ stands for number average molecular weight, and having a hydroxyl value of about 150 to about 400 mg KOH/g.

The molecular weight of a compound synthesized by polymerization, condensation, addition reaction or the like is generally not a single value but has a certain variance or distribution. While the average molecular weight of such a compound can be expressed in various terms, it is most commonly expressed in terms of weight average molecular weight ($\overline{Mw}$) and number average molecular weight ($\overline{Mn}$). The ratio $\overline{Mw}/\overline{Mn}$ is frequently used as an indicator of the breadth of molecular weight distribution. When there is no molecular weight distribution, $\overline{Mw}/\overline{Mn}$ is equal to 1. The larger the $\overline{Mw}/\overline{Mn}$ ratio, the larger is the molecular weight of the compound. The $\overline{Mw}/\overline{Mn}$ values of the ordinary surface coating acrylic resin, alkyd resin and polyester resin are within the range of about 2 to about 8.

In the present invention, the weight average molecular weight ($\overline{Mw}$), number average molecular weight ($\overline{Mn}$) and $\overline{Mw}/\overline{Mn}$ of components (A) and (B) were determined by gel permeation chromatography using a calibration curve constructed with polystyrene as a standard.

It is important that the weight average molecular weight of (A) component be selected within the range of about 400 to about 2,000 and preferably within the range of about 500 to about 1,800. If the weight average molecular weight is less than 400, film characteristics such as weather resistance will be adversely affected and a greater proportion of (A) component be vaporized at baking to present problems in equipment management. Conversely, if the weight average molecular weight exceeds 2,000, the density of crosslinks in the film will not be sufficiently high, with the consequent failure to assure an adequate scratch resistance.

The molecular weight distribution of (A) component is also important. In the practice of the invention, (A) component must have a narrow molecular weight distribution. That is to say, the ratio of weight average molecular weight to number average molecular weight, ($\overline{Mw}/\overline{Mn}$), should be about 1.6 or less and preferably about 1.4 or less. If the $\overline{Mw}/\overline{Mn}$ ratio exceeds 1.6, the scratch resistance of the film will be undesirably sacrificed. This decrease in scratch resistance appears to take place since the molecular weight distribution between crosslinking sites becomes uneven so that the film ceases to show a microscopic elastic deformation essential to scratch resistance.

As examples of a low molecular polyol resin having such a defined molecular weight distribution, the following types of polyols (i) through (iv) can be mentioned.

(i) A branched polyester polyol within the afore-mentioned molecular weight range and molecular weight distribution range which is obtainable by condensation reaction of an organic acid component and an alcohol component which are used in the production of ordinary coating polyester resins.

As said organic acid component, a polybasic acid is generally employed. Examples of such polybasic acid include phthalic acid, isophthalic acid, terephthalic acid, tetrahydrophthalic acid, tetrahydroterephthalic acid, hexahydrophthalic acid, hexahydroisophthalic acid, hexahydroterephthalic acid, chlorendic acid, trimellitic acid, hexahydrotrimellitic acid, pyromellitic acid, cyclohexanetetracarboxylic acid, methyltetrahydrophthalic acid, methylhexahydrophthalic acid, endomethylenehexahydrophthalic acid, methyl-endomethylenetetrahydrophthalic acid, maleic acid, fumaric acid, itaconic acid, succinic acid, glutaric acid, adipic acid, azelaic acid, sebacic acid, decanedicarboxylic acid, suberic acid, pimelic acid, dimer acid (dimer of tall oil fatty acid), tetrachlorophthalic acid, naphthalenedicarboxylic acid, 4,4'-diphenylmethanedicarboxylic acid, 4,4'-dicarboxybiphenyl, etc., as well as acid anhydrides and dialkyl esters, particularly dimethyl esters, thereof.

As said alcohol component, a dihydric alcohol or a trihydric alcohol is generally employed. Examples of such dihydric alcohol include ethylene glycol, propylene glycol, 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methylpentane-1,5-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, diethylene glycol, dipropylene glycol, triethylene glycol, neopentyl glycol, hydroxypivalic acid neopentyl glycol ester, polyalkylene oxide, bis-hydroxyethyl terephthalate, (hydrogenated) bisphenol A-alkylene oxide adduct, and so on. Aside from the above-mentioned compounds, monoepoxy compounds such as Cardura E10 (the product of Shell Chemicals, Co., Ltd.; glycidyl ester of a synthetic saturated monocarboxylic acid of highly branched structure containing ten carbon atoms), α-olefin epoxide, butylene oxide, etc. can also be used as glycols for the purposes of the invention. Examples of said trihydric and polyhydric alcohols include glycerol, trimethylolpropane, trimethylolethane, diglycerol, pentaerythritol, dipentaerythritol, sorbitol and so on.

Compounds having both carboxy and hydroxy groups within the molecule can also be employed. Thus, dimethylolpropionic acid, pivalic acid, 12-hydroxystearic acid, ricinoleic acid, etc. may be mentioned as examples. Being cyclic ester compounds, lactones such as γ-caprolactone, γ-valerolactone, etc. also fall within the category of the above-mentioned compounds.

The aforementioned organic acids and alcohols may each be partially replaced with various monofunctional materials such as natural or synthetic higher fatty acids, higher alcohols, benzoic acid, p-t-butylbenzoic acid, etc. or natural oils.

This low molecular weight polyester polyol is branched. To provide a branched structure, there must be a trihydric or polyhydric alcohol and/or a polybasic acid among the starting materials.

Production of such a branched low molecular weight polyester polyol within the aforementioned ranges of molecular weight and molecular weight distribution using such starting materials may be carried out by a conventional polyester synthesizing procedure in some cases. In many cases, however, some special contrivances such as those described below must be made in regard to the process of synthesis, selection of starting materials, and purification of the product. For such a contrivance concerning the process of synthesis, synthesis of the desired polyester polyol is, for example, preferably conducted in solution phase in the presence of an appropriate catalyst such as p-toluenesulfonic acid or monobutyltin hydroxide, and a large amount (for example, about 30 to about 150 parts by weight per 100 parts by weight of the polyester resin component) of an inert solvent having a high boiling temperature such as a solvent based on an alkylbenzene having a boiling temperature within the range of about 130° to about 250° C., under reflux conditions for a protracted time, for example about 15 to about 40 hours. By this procedure, the molecular weight distribution of the product polyester polyol can be narrowed. For a contrivance concerning the selection of starting materials, the molecular weight distribution of the polyester polyol can be made to be narrow, for example, by selecting those materials which can be synthesized by relying exclusively on addition reaction which is high in reaction rate, for example either Cardura E10 (Shell Chemicals, Co., Ltd.) in combination with trimellitic acid or phthalic anhydride in combination with trimethylolpropane. To be more specific, a polyester polyol having a narrow molecular weight distribution can be obtained by adding 3 moles of a monoepoxy compound to each mole of trimellitic acid. Regarding the method of purification of the reaction product, there may be mentioned a fractional precipitation process (cut-off of a high molecular weight fraction) which comprises adding an appropriate poor solvent (for example, petroleum ether) to a solution of the low molecular weight polyester polyol, a reprecipitation process (cut-off of a low molecular weight fraction) which comprises adding a solution of the low molecular polyester polyol to a large amount of a poor solvent so as to precipitate the resin, a vaporization process in which a low molecular weight fraction is evaporated off under reduced pressure at elevated temperature, and a fractionation process utilizing the pressure- and temperature-dependent solubility of the resin in a medium in super-critical state.

The $\overline{Mw}$ value can be controlled within the range of about 400 to about 2,000 by using the polybasic acid in a mole ratio of about 0.4 to about 0.75 based on the polyhydric alcohol.

A preferred example of said low molecular weight branched polyester polyol is a polyester polyol synthesized from cyclohexanedimethanol, trimethylolpropane, succinic anhydride and adipic acid in Swasol 1500 (Cosmo Oil Company, Ltd., an aromatic petroleum solvent) using monobutyltin hydroxide as a catalyst.

(ii) A linear polyester polyol prepared from the starting materials which are conventionally used in the production of ordinary coating polyester resins and having a molecular weight and a molecular weight distribution within the aforementioned respective ranges.

As such starting materials for the production of the linear polyester polyol defined above, all the materials mentioned under (i) other than tri- and polyhydric alcohols and tri- and polybasic acids can be utilized.

Production of such a linear polyester polyol having aforesaid molecular weight and molecular weight distribution can be carried out by conventional production procedures for polyesters in more cases than in the production of (i), but the special contrivances mentioned for (i) in regard to the method of synthesis, selection of starting materials and purification of the reaction product may be adopted as needed.

As a preferred example of said linear polyester polyol may be mentioned a polyester polyol which can be prepared by synthesizing a polyester from hexahydrophthalic anhydride, adipic acid and neopentyl glycol and, then, removing a low molecular weight fraction therefrom by prolonged distillation under reduced pressure at elevated temperature (for example, about 230° to about 240° C., about 5 to about 10 hours, a vacuum of about 20 mmHg).

(iii) A ring-opened polyester polyol prepared by ring-opening polymerization of a lactone compound using a di- or polyhydric alcohol as an initiator and having a molecular weight and a molecular weight distribution within the aforementioned respective ranges.

Examples of said lactone compound include ε-caprolactone, β-methyl-δ-valerolactone, γ-valerolactone, δ-caprolactone, γ-caprolactone, γ-methylvalerolactone, β-propiolactone, γ-butyrolactone and so on. Examples of said polyhydric alcohol used as an initiator include ethylene glycol, diethylene glycol, 1,4-butanediol, 1,6-hexanediol, 3-methyl-pentane-1,5-diol, glycerol, trimethylolethane, trimethylolpropane, pentaerythritol and so on. The catalyst used for said ring-opening polymerization reaction includes, among others, boron trifluoride-ethyl ethoxide, sulfuric acid, phosphoric acid, tetraisopropyl titanate, tetrabutyl titanate, dibutyltin oxide, hydroxytitanium stearate, isoproyltitanium stearate, lead (II) oxide and so on.

In the production of said ring-opened polyester polyol within the aforementioned ranges of molecular weight and molecular weight distribution, a polyol having a narrow molecular weight distribution can be obtained by a conventional ring-opening polymerization reaction process but regarding the method of purification, for instance, the contrivance mentioned hereinbefore in (i) can be adopted as necessary.

As preferred examples of such ring-opened polyester polyol may be mentioned a polyol obtained by adding 5 moles of ε-caprolactone to one mole of ethylene glycol, a polyol obtained by adding 6 moles of ε-caprolactone to one mole of trimethylolpropane, and like polyol. (iv) An acrylic polyol obtainable by copolymering a hydroxy-containing monomer with a copolymerizable monomer and having a molecular weight and a molecular weight distribution within the aforesaid respective ranges.

The hydroxy-containing monomer may be any of the ordinary hydroxy group-containing monomers such as hydroxyethyl acrylate, hydroxyethyl methacrylate, hydroxypropyl acrylate, hydroxypropyl methacrylate and so on. The aforesaid monomer copolymerizable with such hydroxy-containing monomer may be selected from among many different monomers which are usually employed in the synthesis of coating acrylic resins, such as acrylic or methacrylic esters of $C_{1-18}$ monohydric alcohols, styrene, acrylonitrile, acrylamide, methacrylamide, N-methylolacrylamide butyl ether and so on.

The acrylic polyol mentioned above can be obtained by copolymerizing the above monomers and purifying the resulting radical polymerization product by distillation under reduced pressure at elevated temperature or by fractional precipitation.

A preferred example of said acrylic polyol is a polyol obtainable by copolymerizing 25 parts by weight of n-butyl methacrylate, 35 parts by weight of n-butyl acrylate and 40 parts by weight of 2-hydroxyethyl acrylate in solution using mercaptan as a chain transfer agent and azobisisobutyronitrile as a polymerization initiator and purifying the reaction product by distillation under reduced pressure or fractionation.

Furthermore, in the practice of the invention, the total hydroxyl value of (A) component is preferably adjusted to about 150 to about 400 mg KOH/g and, preferably to about 210 to about 350 mg KOH/g. If the hydroxyl value is less than 150 mg KOH/g, the number of sites available for crosslinking reaction with (C) component will be too small to attain a sufficient improvement in scratch resistance, while any hydroxyl value over 400 mg KOH/g results in harmful influences such as decreased waterproof, decreased cratering-proofness at application, and a poor finished appearance. The terms 'hydroxyl value' (mg KOH/g) are used herein to show the index of the number of hydroxy groups contained in the specific component and represent the hydroxy equivalent per gram of the component (nonvolatile matter) as expressed in the number of milligrams of KOH. Furthermore, (A) component preferably contains 2 or more primary hydroxy groups per molecule and, more desirably, about 2.5 to about 4 primary hydroxy groups on the same basis.

The aforesaid (B) component is at least one polyol resin selected from the following groups of resins (1) through (3).

(1) A polyester polyol resin having a weight average molecular weight of about 2,000 to about 50,000, a hydroxyl value of about 50 to about 200 mg KOH/g and a cyclohexylene ring content not less than about 7 percent by weight;

(2) An acrylic polyol resin containing about 20 to about 60 percent by weight, based on the total components of copolymer, of an acrylic and/or methacrylic ester of a monohydric alcohol containing 6 to 18 carbon atoms and having a weight average molecular weight of about 5,000 to about 50,000 and a hydroxyl value of about 50 to about 180 mg KOH/g;

(3) A mixed polyol resin consisting of a nonaqueous dispersion-type acrylic resin prepared by dispersion-polymerizing at least one vinyl monomer in the presence of a polymer dispersion stabilizer and an organic solvent and a solution-type acrylic polyol resin having a weight average molecular weight of about 5,000 to about 50,000 and a hydroxyl value of about 50 to about 180 mg KOH/g.

The above polyester resin (1) can be prepared, for example by using a polybasic acid and a polyhydric alcohol as main reactants and subjecting them to condensation reaction.

For the production of this polyester resin, any of the starting materials mentioned for the production of said low molecular weight polyester polyol (i) as a species of (A) component can be employed.

As examples of the starting material used for introducing cyclohexylene rings into the resin, there may be mentioned hexahydrophthalic acid (anhydride), hexahydroisophthalic acid, hexahydroterephthalic acid, cyclohexanedimethanol, cyclohexene oxide, methylhexahydrophthalic acid (anhydride) and so on. Preferred is a polyester resin obtainable by using, among these materials, hexahydroterephthalic acid in particular.

In the present invention, it counts much that the cyclohexylene ring content of the polyester resin is not less than about 7 percent by weight. This is because, while a film of homogeneous structure is formed by interaction based on the mutual compatibility of (A) and (B) components, it is considered that cyclohexylene rings play a significant role in the formation of such a uniform film. A cyclohexylene ring content less than 7 percent by weight is undesirable in that the scratch resistance of the film will then be low. A cyclohexylene ring content up to about 60 percent by weight can be attained by using the known materials for the introduction of cyclohexylene rings into resins, such as hexahydrophthalic anhydride, hexahydroterephthalic acid, hexahydroisophthalic acid, cyclohexanedimethanol and so on.

The polyester resin mentioned above should have a weight average molecular weight in the range of about 2,000 to about 50,000, preferably about 2,200 to about 30,000, and a hydroxyl value within the range of about 50 to about 200 mg KOH/g, preferably about 60 to about 150 mg KOH/g.

If the weight average molecular weight of the polyester resin is less than 2,000, the durability and acid resistance of the film will be sacrificed and if it exceeds 50,000, coating workability will be adversely affected and the finished appearance, particularly image sharpness, be sacrificed. On the other hand, if the hydroxyl value is less than 50 mg KOH/g, the number of sites available for crosslinking reaction with (melamine of C) component is so small that cause a decrease in water resistance. If it exceeds 200 mg KOH/g, the total hydroxyl groups in (A) and (B) components become excessive, in the result that adversely affect the humidity resistance of the film, interfere with pigment dispersibility and, hence, detract from the finished appearance.

This polyester resin preferably has a branched structure from the standpoints of practical coat performance and scratch resistance. Therefore, it is preferable that based on the total polyhydric alcohol in the charged raw material, the trihydric and/or tetrahydric alcohol is contained at least about 10 mole percent.

The acrylic polyol resin (2) mentioned above comprises an alkyl ($C_{6-18}$) ester of (meth)acrylic acid and a hydroxy-containing monomer as essential monomer units and can be obtained by copolymerizing them with each other, or copolymerizing them with one or more other copolymerizable monomers.

The alkyl ($C_{6-18}$) ester of (meth)acrylic acid includes acrylic or methacrylic esters of monohydric alcohols containing 6 to 18 carbon atoms, such as hexyl (meth)acrylate, 2-ethylhexyl (meth)acrylate, octyl (meth)acrylate, lauryl (meth)acrylate, palmityl (meth)acrylate, stearyl (meth)acrylate and son on. It is essential that one or more of such esters be contained in a proportion of about 20 to about 60 percent by weight and preferably about 30 to about 50 percent by weight in the total comonomer component. If the proportion is less than 20 percent by weight, a clear coating (a coating composition of the invention) tends to undergo intermingling with the base coat to detract from the finished appearance. Conversely if the proportion exceeds 60 percent by weight, the clear coating yields only a soft film with reduced scratch resistance.

The hydroxy-containing monomer mentioned above includes, among others, acrylic or methacrylic $C_{2-8}$ hydroxyalkyl esters such as 2-hydroxyethyl (meth)acrylate, 2-hydroxypropyl (meth)acrylate, 3-hydroxypropyl (meth)acrylate, 4-hydroxybutyl (meth)acrylate, etc.; monoesters of polyether polyols, such as polyethylene glycol, polypropylene glycol, polybutylene glycol, etc., with an unsaturated carboxylic acid such as (meth)acrylic acid; monoethers of polyether polyols, such as polyethylene glycol, polypropylene glycol, polybutylene glycol, etc. with hydroxy-containing monomers such as 2-hydroxy (meth)acrylate etc.; adducts of $\alpha,\beta$-unsaturated carboxylic acids to monoepoxy compounds such as Cardura E10 (Shell Chemicals, Co., Ltd.), $\alpha$-olefin epoxides, etc., adducts of glycidyl (meth)acrylates to monobasic acids such as p-(tert-butyl)benzoic acid, fatty acids (e.g. acetic acid, propionic acid), etc.; mono- or di-esters of acid anhydride group-containing unsaturated compounds such as maleic anhydride, itaconic anhydride, etc. with glycols such as ethylene glycol, 1,6-hexanediol, neopentyl glycol, etc.; and hydroxyalkyl vinyl ethers such as hydroxyethyl vinyl ether and so on. Monomers containing a chlorine atom and a hydroxy group, such as 3-chloro-2-hydroxypropyl (meth)acrylate can also be employed.

The monomer copolymerizable with the aforementioned two essential monomers include (meth)acrylic ester monomers containing no functional group other than the double bond and other vinyl monomers. The (meth)acrylic ester monomer include methyl acrylate, methyl methacrylate, ethyl acrylate, ethyl methacrylate, propyl acrylate, propyl methacrylate, butyl acrylate, butyl methacrylate and so on. Examples of said vinyl monomers include styrene and its derivatives, acrylonitrile, acrylamide, vinyltoluene, vinyl acetate, glycidyl methacrylate, acrylic acid, methacrylic acid and so on. When such a vinyl monomer is used, it is preferably copolymerized in a proportion not exceeding about 50 parts by weight per 100 parts by weight based on the sum of said two essential monomers.

The aforesaid (meth)acrylic alkyl ($C_{6-18}$) ester monomer, hydroxy-containing monomer, and necessarily other copolymerizable monomer can be easily copolymerized by the conventional solution polymerization process to give an acrylic polyol resin as said component (2).

The aforementioned acrylic polyol resin must have a weight average molecular weight within the range of about 5,000 to about 50,000, preferably about 9,000 to about 40,000, and a hydroxyl value within the range of about 50 to about 180 mg KOH/g, preferably about 60 to about 150 mg KOH/g.

If the weight average molecular weight of said acrylic polyol resin is less than 5,000, the durability and acid resistance of the resulting film will be sacrificed, and if it exceeds 50,000, coating workability will be adversely affected and the finished appearance, particularly image sharpness, will also deteriorate. On the other hand, if the hydroxyl value of the resin is less than 50 mg KOH/g, the number of sites available for cross-linking reaction with (C) component melamine will be too small to provide sufficient scratch resistance and water resistance. If the hydroxyl value exceeds 180 mg KOH/g, the total hydroxyl groups in (A) and (B) components become excessive, in the result that to adversely affect the humidity resistance of the film or result in insufficient wetting of the base coat.

The aforementioned (3) component is a mixed polyol resin consisting of a non-aqueous dispersion-type acrylic resin prepared by dispersion-polymerizing at least one vinyl monomer in the presence of a polymer dispersion stabilizer and an organic solvent, and a solution-type acrylic polyol resin having a weight average molecular weight of about 5,000 to about 50,000 and a hydroxyl value of about 50 to about 180 mg kOH/g.

The polymer dispersion stabilizer mentioned above may be any of the known stabilizers used commonly in the field of non-aqueous dispersions, and may include the following substances (1) through (9) as examples.

(1) A polyester macromer having about 1.0 polymerizable double bond within the molecule as obtainable upon addition of glycidyl acrylate or glycidyl methacrylate to an auto-condensation polyester of a hydroxy-containing fatty acid such as 12-hydroxystearic acid.

(2) A comb-type polymer prepared by copolymerizing the polyester macromer mentioned under (1) with methyl methacrylate and/or other (meth)acrylic ester or a vinyl monomer.

(3) A polymer obtainable by the steps of copolymerizing the polymer described under (2) with a small amount of glycidyl (meth)acrylate and, then, adding (meth)acrylic acid to the glycidyl groups thereof so as to introduce double bonds.

(4) A hydroxy-containing acrylic copolymer prepared by copolymerizing at least 20 percent by weight of (meth)acrylic ester of a monohydric alcohol containing 4 or more carbon atoms.

(5) An acrylic copolymer obtainable by producing at least 0.3 double bond per molecule, based on its number average molecular weight, into the copolymer mentioned under (4). A method for introducing double bonds may for example comprise copolymerizing the acrylic polymer with a small amount of glycidyl (meth)acrylate and then adding (meth)acrylic acid to the glycidyl group.

(6) An alkylmelamine resin with a high tolerance to mineral spirit.

(7) An alkyd resin with an oil length not less than 15 percent and/or a resin obtainable by introducing polymerizable double bonds into said alkyd resin. A method of introducing double bonds may, for example, comprise addition reaction of glycidyl (meth)acrylate to the carboxyl groups in the alkyd resin.

(8) An oil-free polyester resin with a high tolerance to mineral spirit, an alkyd resin with an oil length less than 15 percent, and/or a resin obtainable by introducing double bonds into said alkyd resin.

(9) A cellulose acetate butyrate into which polymerizable double bonds have been introduced. An exemplary method of introducing double bonds comprises addition reaction of isocyanatoethyl methacrylate to cellulose acetate butyrate.

These dispersion stabilizers can be used alone or in combination.

Among the aforementioned dispersion stabilizers, preferred for the purposes of the invention are those which can be dissolved in comparatively low polar solvents such as aliphatic hydrocarbons and may assure the film performance requirements to some extent. As dispersion stabilizers which can meet such conditions, the acrylic copolymers mentioned under (4) and (5) are desirable in that they not only lend themselves well to adjustment of molecular weight, glass transition temperature, polarity (polymer SP value), hydroxyl value, acid value and other parameters but are excellent in weatherability. More desirable are acrylic copolymers containing an average of about 0.2 to about 1.2 polymerizable double bonds, per molecule, which are graft copolymerizable with dispersed particles.

The non-aqueous dispersion-type acrylic resin used in accordance with this invention can be easily prepared by dispersion-polymerizing at least one vinyl monomer in the presence of the above polymer dispersion stabilizer and in an organic solvent mainly containing an aliphatic hydrocarbon in which said dispersion stabilizer and vinyl monomer forming dispersed particles as mentioned hereinafter are soluble but in which the polymer particles formed by said vinyl monomer are not soluble.

The monomer component forming said acrylic copolymer suitable as said polymer dispersion stabilizer and the vinyl monomer forming said dispersed particles may be virtually any radical-polymerizable unsaturated monomer and a variety of monomers can be utilized for the purpose. Typical examples of such monomers include the following.

(a) Esters of acrylic acid or methacrylic acid: for example, $C_{1-18}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, stearyl methacrylate, etc.; glycidyl acrylate and glycidyl methacrylate; $C_{2-8}$ alkenyl esters of acrylic or methacrylic acid such as allyl acrylate, allyl methacrylate, etc.; $C_{2-8}$ hydroxyalkyl esters of acrylic or methacrylic acid such as hydroxyethyl acrylate, hydroxyethyl methacrylate, hydroxypropyl acrylate, hydroxypropyl methacrylate, etc.; and $C_{3-18}$ alkenyloxyalkyl esters or acrylic or methacrylic acid such as allyloxyethyl acrylate, allyloxyethyl methacrylate and so on.

(b) Vinyl aromatic compounds: for example, styrene, α-methylstyrene, vinyltoluene, p-chlorostyrene, vinylpyridine and so on.

(c) α,β-Ethylenically unsaturated acids: for example, acrylic acid, methacrylic acid, itaconic acid and so on.

(d) Amides of acrylic or methacrylic acid: for example acrylamide, methacrylamide, n-butoxymethylacrylamide, N-methylolacrylamide, n-butoxymethylmethacrylamide, N-methylolmethacrylamide and so on.

(e) Others: for example, acrylonitrile, methacrylonitrile, methyl isopropenyl ketone, vinyl acetate, VeoVa monomer (product of Shell Chemicals, Co., Ltd.; mixed vinyl esters of a synthetic saturated monocarboxylic acid of highly branched structure containing ten carbon atoms), vinyl propionate, vinyl pivalate, isocyanatoethyl methacrylate, perfluorocyclohexyl (meth)acrylate, p-styrenesulfonamide, N-methyl-p-styrenesulfonamide, γ-methacryloyloxypropyl trimethoxy silane and so on.

Among the monomers mentioned above, the following materials can be used with particular advantage for the preparation of said acrylic copolymer used as a dispersion stabilizer: mixed monomers based on comparatively long-chain, low-polar monomers, such as n-butyl methacrylate, 2-ethylhexyl methacrylate, dodecyl methacrylate, lauryl methacrylate, stearyl methacrylate, etc., supplemented as necessary with styrene, methyl (meth)acrylate, ethyl (meth)acrylate, 2-hydroxyethyl (meth)acrylate, propyl (meth)acrylate, (meth)acrylic acid and so on. The dispersion stabilizer may be one prepared by adding glycidyl (meth)acrylate or isocyanatoethyl methacrylate to a copolymer of said monomers for introduction of polymerizable double bonds.

The acrylic copolymer used as said dispersion stabilizer can be easily prepared using a radical polymerization initiator in accordance with the known solution polymerization process.

The number average molecular weight of the dispersion stabilizer is preferably in the range of about 1,000 to about 50,000 and, for still better results, about 3,000 to about 20,000.

Among the monomers mentioned above, particularly preferred vinyl monomers for the formation of said dispersed particles predominantly contain comparatively high-polarity monomers, such as methyl (meth)acrylate, ethyl (meth)acrylate, n-butyl (meth)acrylate, acrylonitrile, etc., supplemented as necessary with (meth)-acrylic acid, 2-hydroxyethyl (meth)acrylate and the like. It is also possible to provide gel particles as cross-linked in molecules by copolymerizing a small amount of polyfunctional monomers such as divinylbenzene, ethylene glycol dimethacrylate, etc., by copolymerizing a plurality of monomers having mutually reactive functional groups, such as glycidyl methacrylate and methacrylic acid, or by copolymerizing an auto-reactive monomer such as N-alkoxymethylated acrylamides, γ-methacryloyloxypropyl trimethoxy silanes, and so on.

In conducting said dispersion polymerization, the ratio of said dispersion stabilizer to said vinyl monomer forming dispersed particles is selected from the range of about 5/95—about 80/20 by weight, preferably about 10/90—about 60/40 by weight, and the dispersion polymerization can be conducted in the presence of a radical polymerization initiator by a known procedure.

While the particle size of the resulting non-aqueous dispersion type acrylic resin is generally in the range of about 0.05 to about 2 μm, the range of about 0.1 to about 0.7 μm is preferable from the stability of shelf life and the gloss, smoothness and weatherability of the film.

The solution type acrylic polyol resin as a species of said component (3) has a weight average molecular weight of about 5,000 to about 50,000 and a hydroxyl value of about 50 to about 180 mg KOH/g. This type of resin can be easily prepared by polymerizing radical-polymerizable unsaturated monomers, such as those above-described as vinyl monomers for use in the preparation of said non-aqueous dispersion type acrylic resin, in the presence of a radical polymerization initiator in accordance with a conventional solution polymerization process. Among such monomers, monomers such that the sum of $C_{1-18}$ alkyl esters of acrylic or methacrylic acid accounts for at least about 40 percent by weight are preferable in terms of weather resistance and mirror quality.

The acrylic polyol resin mentioned above must have a weight average molecular weight in the range of about 5,000 to about 50,000, preferably about 9,000 to about 20,000, and a hydroxyl value in the range of about 50 to about 180 mg KOH/g, preferably about 60 to about 150 mg KOH/g.

If the weight average molecular weight is less than 5,000, the durability and acid resistance of the film will be adversely affected. On the other hand, poor coating workability and deterioration of finished appearance, particularly imarge sharpness, of the coat will result when the weight average molecular weight of the acrylic polyol resin exceeds 50,000. If the hydroxyl value of the resin is less than 50 mg KOH/g, the number of sites available for crosslinking reaction with (C) component melamine will be decreased to adversely affect waterproof, etc. If the hydroxyl value exceeds 180 mg KOH/g, the total number of hydroxy groups in (A) and (B) components become excessive, in the result that adversely affect and, owing to an increased miscibility with the base coat, detract from the finished appearance.

The ratio of said non-aqueous dispersion type acrylic resin to said solution type acrylic polyol is generally about 10–70/about 90–30 and preferably about 20–60/about 80–40. If the proportion of the non-aqueous dispersion type acrylic resin is increased too much, the flatness/smoothness of the film tends to deteriorate. On the other hand, if the proportion of said non-aqueous dispersion type acrylic resin is below the above-mentioned range, there is encountered a problem with the coating composition is used as a clear coating in the so-called two-coat one-bake system, i.e. admixing with the base coat takes place at coating or setting to detract from the finished appearance.

The aforesaid (C) component is an alkoxy monomeric melamine.

In the context of the present invention, the terms 'alkoxy monomeric melamine' means a low molecular weight melamine which contains, on an average three or more methylol groups etherized with a $C_{1-5}$ monohydric alcohol such as methanol, n-butanol, isobutanol or the like per triazine nucleus, and has an average degree of condensation up to about 2 and preferably in the range of about 1.1 to about 1.8, and has a proportion of mononuclear species not less than about 50 percent by weight. Commercially available products of such melamines include, among others, methyl etherified melamines such as Cymel 303, Cymel 325, Cymel 327, Cymel 350 and Cymel 370 (all available from Mitsui Toatsu Chemicals, Inc.), Nikalac MS17, Nikalac MS15 (both available from Sanwa Chemical Co., Ltd.), Resimene 741 (available from Monsanto Company), Sumimal M-55 (available from Sumitomo Chemical Company Ltd.), etc.; and methyl-butyl mixed etherified melamines such as Cymel 202, Cymel 235, Cymel 238, Cymel 254, Cymel 272 and Cymel 1130 (all available from Mitsui Toatsu Chemicals, Inc.), Nikalac MX-485, Nikalac MX-487 (both available from Sanwa Chemical Co., Ltd.), Resimene 755 (Monsanto Chemical) and so on. If the average degree of condensation of this melamine exceeds 2 or the proportion of mononuclear species is less than about 50 percent by weight, the elasticity distribution of the cured product will not be uniform, thus detracting from scratch resistance. On the other hand, if the average number of etherized methylol groups per triazine nucleus is less than 3, the melamine will tend to undergo auto-condensation at the curing temperature to cause uneven elasticity, thus detracting from scratch resistance.

The composition of the present invention comprises as principle components on the aforementioned three principal components (A) through (C) and the preferred proportions of these respective components based on the total weight of (A) through (C) are about 15—about 60 percent by weight, preferably about 20—about 40 percent by weight, for (A, about 15—about 60 percent by weight, preferably about 30—about 50 percent by weight, for (B), and about 20—about 50 percent by weight, preferably about 25—about 40 percent by weight, for (C). If the proportion of (A) component is less than 15 percent by weight, the crosslinking reaction with (C) component will not take place as much as necessary to form an adequate crosslinked structure so that the scratch resistance of the film will not be satisfactory. Conversely if the proportion of (A) exceeds 60 percent by weight, the humidity resistance, resistance to chemicals, impact resistance, etc. of the film will be inadequate. If the proportion of (B) component is less than 15 percent by weight, top coat characteristics other than scratch resistance will be sacrificed. On the other hand, if the proportion of (B) exceeds 60 percent by weight, the desired degree of scratch resistance will not be obtained. If the proportion of (C) component is less than 20 percent by weight, the formation of a network (crosslinked structure) supplying adequate elasticity for scratch resistance will be interfered with. Conversely if the proportion of (C) exceeds 50 percent by weight, the network will be too tight, in the result that make the film fragile or less resistance to chemicals' particularly to acid resistance.

The coating composition of the invention can be advantageously provided by dissolving or dispersing the aforesaid components (A) through (C) in an organic solvent. The organic solvent mentioned above is preferably one that is able to dissolve or disperse all of the (A), (B) and (C) components and, as such, include hydrocarbons such as hexane, heptane, octane, xylene, toluene, etc., esters such as ethyl acetate, butyl acetate, amyl acetate, ethylene glycol monomethyl ether acetate, ethylene glycol monoethyl ether acetate, etc.; ethers such as dibutylether, dioxane, ethylene glycol monomethyl ether, ethylene glycol monomethyl ether, ethylene glycol monobutyl ether, ethylene glycol diethyl ether, diethylene glycol monobutyl ether, etc., alcohols such as methanol, ethanol, isopropyl alcohol, butanol, amyl alcohol, 2-ethylhexyl alcohol, cyclohexanol, etc.; ketones such as methyl ethyl ketone, methyl isobutyl ketone, cyclohexanone, isophorone, etc.; high-solvency petroleum naphthas such as Swazol 310 (tradename of Cosmo Oil Company, Ltd.; b.p. ca 150°–178° C.), Swazol 1000 (same as above; b.p. ca 159°–173° C.), Swazol 1500 (same as above; b.p. ca 185°–204° C.), and so on.

In the coating composition of the invention may be incorporated a leveling agent, rheology modifier, ultraviolet absorber, light stabilizer, curing catalyst and so on, of necessary. Among these additives, the rheology modifier is described in detail below.

Since (A) in the composition of the invention is a low molecular weight component, its low viscosity tends to cause sagging when the coating composition is applied. Therefore, an appropriate rheology modifier is preferably added. Among the hitherto-known modifiers are finely divided silica powder, bentonite, polyamide type modifiers, crosslinked particles prepared by aqueous emulsion polymerization, and crosslinked particles prepared by non-aqueous polymerization, and so on. However, when incorporated in the coating composition of the invention, all of these known rheology modifiers show a marked tendency to reduce the gloss of the coating film, thus being unsuitable for practical application. Among conventional rheology modifiers, diurea type modifiers are most suitable for purposes of this invention, i.e. prevention of sagging of the coating composition of the invention without causing a decrease in gloss of the coating film. It has been confirmed that a diurea type rheology modifier is capable of inhibiting a decrease in gloss of the coating film in relation to the high hydroxyl value and low molecular weight of (A) component. This appears to be owing to that low molecular weight of (A) component may give well compatibility with diurea and that diurea has a good affinity for unreacted hydroxyl groups remaining in the cured three-dimensional network structure. A preferred example of said diurea type rheology modifier is a reaction product between a primary monoamine and a diisocyanate compound. Thus, for example, the various compounds disclosed in U.S. Pat. No. 4,311,622, namely the adduct of 2 moles of benzylamine to 1 mole of hexamethylene diisocyanate, the adduct of 2 moles of n-propylamine to 1 mole of hexamethylene diisocyanate, the adduct of 2 moles of n-propylamine to 1 mole of tolylene diisocyanate, etc., may be utilized.

The addition of such a diurea assures an excellent smoothness of the coating film and prevention of sagging, and other untoward events. This is probably owing to that the inter-molecular hydrogen bond of the diurea forms with a time lag after spray coating so that structural viscosity property appears in mutual exclusion with fluidity.

The diisocyanate used for the preparation of said diurea may be aliphatic, aromatic or alicyclic. Preferred examples of such diisocyanates include hexamethylene-1,6-diisocyanate, hexamethylene-1,6-diisocyanate trimer, isophorone diisocyanate, toluene diisocyanate and so on. Examples of said primary monoamines include monoamines or hydroxymonoamines containing 1 to 5 aliphatic carbon atoms. Preferred are benzylamine, monoamines containing 1 to 4 aliphatic carbon atoms such as propylamine and t-butylamine, etc., and hydroxymonoamines such as 2-aminoethanol, 1-aminoethanol, 2-aminopropanol, 3-aminopropanol and so on. The reaction between the aforementioned two reactants can be easily conducted, for example, by allowing equimolar amounts of the diisocyanate and monoamine to react in an appropriate resin solution at room temperature. In this reaction, the resin solution serves to prevent coagulation of diurea crystals. This diurea is effectively used in a proportion of about 0.1—about 3 percent by weight and preferabl y about 0.5— about 1.5 percent by weight based on the total resin solid of the coating composition of the invention.

The coating composition of the invention is a thermosetting coating composition and is usually applied as top coat. Coating with the composition of the invention is preferably carried out by the conventional surface coating technology, which includes air-spraying, airless spraying and electrostatic spray coating techniques. The coating thichness is preferably about 20 to about 50μ on a dry basis. The heat curing is preferably conducted under the ordinary conditions, for example at about 60° to about 180° C., preferably about 80° to about 160° C., for about 10 to about 40 minutes.

The coating composition of the invention is particularly excellent in the scratch resistance of the coating film is formed on the substrate. Therefore, it is applicable as top coating to substrates which call for high scratch resistance, for example, automotive plates, furniture, architectural materials and so on, and particularly suitable for automotive plates in dark colors. The coating composition of the invention not only excels in scratch resistance but also is superior in waterproof, humidity resistance, resistance to chemicals, impact resistance, durability, weatherability, flatness and smoothness, image sharpness and other characteristics. It is an epocal coating material in that sophisticated finishes can be easily attained.

The following examples and comparative examples are further illustrative of the present invention. Unless otherwise specified, "part(s)" and "%" are on the weight basis.

[1] Preparation of Samples

Production of (A) components

Production Example 1 (Production of polyol solution Aa)

A flask was charged with 53.8 parts of cyclohexanedimethanol, 12.8 parts of trimethylolpropane, 44.3 parts of adipic acid, 60 parts of Swazol 1500 and 0.5 part of monobutyltin hydroxide. The reaction was carried out under reflux of the solvent while the byproduct water of condensation was removed via a water separator. When the acid value became 7, the reaction was terminated, and the reaction mixture was concentrated under reduced pressure.

The solution thus obtained had a solid content of 80.0%, and the solids had a hydroxyl value of 247, a weight average molecular weight ($\overline{Mw}$) of 1,170 and a $\overline{Mw}/\overline{Mn}$ ($\overline{Mn}$: number average molecular weight) ratio of 1.3.

Production Example 2 (Production of polyol solution Ab)

A flask was charged with 32.0 parts of hexahydrophthalic anhydride, 22.8 parts of adipic acid and 54.6 parts of neopentyl glycol, and the flask contents were heated. The reaction was effected by raising the temperature from 160° C. to 230° C. over 5 hours while the byproduct water of condensation was removed via a rectification column. The temperature was then maintained at 230° C. for 2 hours. Thereafter, xylene was added, and the reaction was allowed to proceed further under reflux of xylene at 230° C. while the byproduct water of condensation was removed via the water separator. When the acid value became 6, the pressure of the system was reduced while that temperature was maintained. The reduced pressure was maintained until about 5 parts of a mixture composed of low-molecular-weight products and unreacted neopentyl glycol had been removed. The resultant reaction mixture was cooled, and 23.5 parts of ethyleneglycol monoethylether, acetate was added. The solution thus obtained had a solid content of 80.1%, and the solids had a hydroxyl value of 176, a $\overline{Mw}$ value of 950 and a $\overline{Mw}/\overline{Mn}$ ratio of 1.28.

Production Example 3 (Production of polyol Ac)

A flask was charged with 25.0 parts of trimethylolpropane, 25.0 parts of ε-caprolactone and 0.1 part of tetrabutyl titanate, the mixture was heated to 100° C., and that temperature was maintained for 1 hour. Then, the temperature was raised to 120° C., and 50.0 parts of ε-caprolactone was added dropwise to said mixture over 1 hour. Thereafter, the temperature was raised to 180° C., and the reaction was continued until the refractive index of the reaction mixture did not change any more. The pressure of the system was then reduced and, after removal of small amounts of unreacted reactants and low-molecular-weight products, the system was cooled. The product thus obtained had a solid content of 100%, and the solids had a hydroxyl value of 302, a $\overline{Mw}$ value of 1,010 and a $\overline{Mw}/\overline{Mn}$ ratio of 1.31.

Production Example 4 (Production of polyol Ad)

Polyol Ad was produced by using as starting materials 31.5 parts of neopentyl glycol, 68.5 parts of ε-caprolactone and 0.1 part of tetrabutyl titanate under otherwise the same conditions as Production Example 3. The product obtained had a solid content of 100%, and the solids had a hydroxyl value of 330, a $\overline{Mw}$ value of 620 and a $\overline{Mw}/\overline{Mn}$ ratio of 1.20.

Production Example 5 (Production of polyol Ae)

A flask was charged with 70 parts of Swazol 1000, and then heated to 150° C. Thereto was added dropwise over 3 hours a mixture of 25 parts of n-butyl methacrylate, 35 parts of n-butyl acrylate, 40 parts of 2-hydroxyethyl acrylate, 4 parts of azobisisobutyronitrile (AIBN) and 3 parts of n-dodecyl mercaptan. Then, 1 part of powdery AIBN was added in 12-devided amount at 5-minute intervals. After addition of the last portion of AIBN, the resultant mixture was maintained at 150° C. for 30 minutes and then cooled. Thereto was added xylene to dilute the mixture to a solid content of 40%. At 80° C., methanol (poor solvent) was added, and the resultant mixture was allowed to cool to 20° C., whereby the mixture separated into two layers. The lower layer was discarded, and the upper layer was treated with petroleum ether for reprecipitation for purification. The precipitating resin was warmed and cooled and dissolved in a mixed solvent composed of xylene and n-butanol (90/10). The acrylic resin solution thus finally obtained had a solid content of 60%, and the solids had a hydroxyl value of 185, a $\overline{Mw}$ value of 1,850 and a $\overline{Mw}/\overline{Mn}$ ratio of 1.50.

Comparative Production Example 1 (Production of polyol solution Af)

A flask was charged with 60.3 parts of cyclohexanedimethanol, 6.4 parts of trimethylolpropane and 44.2 parts of adipic acid, and the mixture was heated with stirring. The temperature was raised from 160° C. to 230° C. over 3 hours while the byproduct water of condensation was removed via a rectification column. After maintaining at 230° C. for 1 hour, xylene was added, and the reaction was continued in the manner of solvent condensation under reflux at 230° C. When the acid value reached 7, the reaction mixture was cooled, and diluted with Swazol 1500 (product of Cosmo Oil Company; aromatic hydrocarbon solvent) to fall a solid content of 80%. The resin solids contained in the solution obtained had a hydroxyl value of 210, a $\overline{Mw}$ value of 1,060 and a $\overline{Mw}/\overline{Mn}$ ratio of 1.80.

Comparative Production Example 2 (Production of polyol solution Ag)

A flask was charged with 52.3 parts of neopentyl glycol, 14.7 parts of phthalic anhydride, 21.8 parts of adipic acid and 20.7 parts of hexahydrophthalic anhydride, and the contents were heated. The temperature was raised from 160° C. to 230° C. over 3 hours while the byproduct water of condensation was removed. Then, the mixture was maintained at 230° C. for 1 hour. Thereafter, xylene was added, and the reaction was allowed to further proceed in the manner of solvent condensation. When the acid value reached 4, the system was placed under reduced pressure. The xylene and low-molecular-weight substances were removed by maintaining the reduced pressure at 230° C. Then, after cooling, 2-ethoxyethyl acetate was added to a solid content of 80%. The resin solids had a hydroxyl value of 132, a $\overline{Mw}$ value of 1,170 and a $\overline{Mw}/\overline{Mn}$ ratio of 1.40.

Comparative Production Example 3 (Production of polyol Ah)

Polyol Ah was produced by using as starting materials 11.7 parts of pentaerythritol, 88.3 parts of ε-caprolactone and 0.1 part of tetrabutyl titanate under otherwise the same conditions as Production Example 3. The product obtained had a solid content of 100%, and the solids had a hydroxyl value of 180, a $\overline{Mw}$ value of 2,300 and a $\overline{Mw}/\overline{Mn}$ ratio of 1.35.

Comparative Production Example 4 (Production of polyol solution Ai)

Polyol solution Ai having a solid content of 60% was produced in the same manner as in Production Example 5 except that the purification step after completion of the radical polymerization reaction was omitted. The solvent composition was Swazol 1500/n-butanol=90/10. The solids had a hydroxyl value of 190, a $\overline{Mw}$ value of 1,750 and a $\overline{Mw}/\overline{Mn}$ ratio of 1.8.

Synthesis of (B) (1) components

Synthesis Example 1 (Production of polyester resin solution B1-a)

A flask was charged with 42.0 parts of hexahydroterephthalic acid, 22.1 parts of isophthalic acid, 12.1 parts of trimethylolpropane and 37.3 parts of neopentyl glycol, and the contents were heated. While the byproduct water of condensation was removed from the system via a rectification column, the temperature was raised from 160° C. to 230° C. over 3 hours. After the temperature of 230° C. was maintained for 2 hours, a small amount of xylene was added, and the reaction was allowed to proceed further in the manner of solvent condensation under reflux of xylene at 230° C. When the acid value reached 6, the reaction mixture was cooled, and diluted with a mixed solvent composed of xylene and Swazol 1000 (50/50) to a solid content of 60%, to give the desired polyester resin solution B1-a. The resin (solids) obtained had a hydroxyl value of 125, an $\overline{M}w$ value of 4,010 and a cyclohexylene ring content of 20.0%.

Synthesis Example 2 (Production of polyester resin solution B1-b)

Polyester resin solution B1-b was prepared in the same manner as in Synthesis Example 1 except that 29.2 parts of hexahydroterephthalic acid, 26.2 parts of hexahydrophthalic anhydride, 43.5 parts of cyclohexanedimethanol and 10.3 parts of trimethylolpropane were used as starting materials. The solution had a solid content of 60%, and the resin solids had a hydroxyl value of 90, an $\overline{M}w$ value of 5,800 and a cyclohexylene ring content of 52.6%.

Synthesis Example 3 (Production of polyester resin solution B1-c)

Polyester resin solution B1-c was produced in the same manner as in Synthesis Example 1 except that 15.3 parts of hexahydrophthalic anhydride, 43.1 parts of isophthalic acid, 7.6 parts of adipic acid, 6.5 parts of trimethylolpropane and 40.4 parts of neopentyl glycol were used as starting materials. The solution had a solid content of 60%, and the resin solids had a hydroxyl value of 58, an $\overline{M}w$ value of 6,470 and a cyclohexylene ring content of 8.2%.

Comparative Synthesis Example 1 (Production of polyester resin solution B1-d)

Polyester resin solution B1-d was produced in the same manner as in Synthesis Example 1 except that 53.7 parts of isophthalic acid, 12.3 parts of propane, 37.7 parts of neopentyl glycol and 9.0 parts of hexahydrophthalic anhydride were used as starting materials. The solution had a solid content of 60%, and the resin solids had a hydroxyl value of 130, an $\overline{M}w$ value of 3,700 and a cyclohexylene ring content of 4.8%.

Comparative Synthesis Example 2 (Production of polyester resin solution B1-e)

Polyester resin solution B1-e was produced in the same manner as in Synthesis Example 1 except that 29.6 parts of hexahydrophthalic anhydride, 21.1 parts of adipic acid, 5.0 parts of phthalic anhydride, 13.1 parts of trimethylolpropane and 40.4 parts of neopentyl glycol were used as starting materials. The solution had a solid content of 60%, and the resin solids had a hydroxyl value of 186, an $\overline{M}w$ value of 1,820 and a cyclohexylene ring content of 15.8%.

Comparative Synthesis Example 3 (Production of polyester resin solution B1-f)

Polyester resin solution B1-f was produced in the same manner as in Synthesis Example 1 except that 26.6 parts of hexahydrophthalic anhydride, 18.9 parts of adipic acid, 17.9 parts of phthalic anhydride, 5.9 parts of trimethylolpropane and 40.7 parts of neopentyl glycol were used as starting materials. The solution had a solid content of 60%, and the resin solids had a hydroxyl value of 40, an $\overline{M}w$ value of 5,400 and a cyclohexylene ring content of 14.1%.

Synthesis of (B) (2) components

Synthesis Example 4 (Synthesis of acrylic resin solution B2-a)

A conventional reaction vessel for acrylic resin production, equipped with a stirrer, a thermometer, a reflux condenser and so on, was charged with 50 parts of Swazol 1000 (Product of Cosmo Oil Company; aromatic solvent) and 15 parts of n-butanol. The mixture was heated with stirring and, after the temperature reached 132° C., the following monomer mixture was added over 3 hours:

| | |
|---|---|
| Styrene | 20 parts |
| Isobutyl methacrylate | 24 parts |
| 2-Ethylhexyl methacrylate | 20 parts |
| Lauryl methacrylate | 15 parts |
| 2-Hydroxyethyl methacrylate | 19 parts |
| Acrylic acid | 2 parts |
| α,α'-Azobisisobutyronitrile | 2 parts |

After completion of the addition of the above monomer mixture, the resultant mixture was maintained at 132° C. for further 1 hour. Then, a mixture of 1 part of t-butyl peroctoate and 10 parts of Swazol 1000 was added over 1 hour. Thereafter, the mixture was maintained at 132° C. for 2 hours with stirring and then cooled. Thereto was added Swazol 1000 to give the desired acrylic resin solution B2-a having a solid content of 50%. The acrylic resin had an $\overline{M}w$ value of 18,000 and a hydroxyl value of 82.

Synthesis Examples 5–8 and Comparative Synthesis Examples 4–8

(Synthesis of acrylic resin solutions B2-b to B2-j)

Acrylic resin solutions B2-b to B2-j were produced in the same manner as in Synthesis Example 4. All the solutions had a solid content within the range of 49.0–51.0%. The composition, $\overline{M}w$, hydroxyl value and (meth)acrylate having $C_6$–$C_{18}$ alkyl group content (% by weight) of each of the acrylic resin solutions B2-a to B2-j are shown below in Table 1.

TABLE 1

| | Comparative Synthesis Example | | | | |
|---|---|---|---|---|---|
| | 4 | 5 | 6 | 7 | 8 |
| Acrylic resin solution | B2-a | B2-b | B2-c | B2-d | B2-e |
| Styrene | 20 | 15 | | 30 | 30 |
| n-Butyl methacrylate | | 16 | | 20 | 15 |
| Iso-Butyl methacrylate | 24 | | 16 | | |
| 2-Ethylhexyl acrylate | | | 20 | | |
| 2-Ethylhexyl methacrylate | 20 | 15 | 20 | | 20 |
| Lauryl methacrylate | 15 | 15 | 15 | 25 | 15 |
| 2-Hydroxyethyl methacrylate | 19 | 17 | | | |
| 2-Hyroxyethylacrylate | | 20 | 27 | | |
| Hydroxypropyl methacrylate | | | | | 18 |
| Hydroxypropyl acrylate | | | | 23 | |
| Acrylic acid | 2 | 2 | 2 | 2 | 2 |
| $\overline{M}w$ | 18000 | 9000 | 31000 | 25000 | 18000 |
| Hydroxyl value | 82 | 170 | 130 | 99 | 70 |
| $C_6$–$C_{18}$ monoalkyl (meth)-acrylate content (%) | 35 | 30 | 55 | 25 | 35 |

| Acrylic resin solution | B2-f | B2-g | B2-h | B2-i | B2-j |
|---|---|---|---|---|---|
| Styrene | 15 | 20 | 15 | 30 | |
| n-Butyl methacrylate | 16 | 20 | 23 | | |
| Iso-Butyl methacrylate | | 18 | 20 | | 8 |
| 2-Ethylhexyl acrylate | | | | | |
| 2-Ethylhexyl methacrylate | 15 | 10 | 15 | 26 | 35 |
| Lauryl methacrylate | 15 | 7 | 15 | | 30 |
| 2-Hydroxyethyl | 17 | 23 | 10 | 21 | |

TABLE 1-continued

|  | Comparative Synthesis Example | | | | |
|---|---|---|---|---|---|
|  | 4 | 5 | 6 | 7 | 8 |
| methacrylate |  |  |  |  |  |
| 2-Hydroxyethyl acrylate | 20 |  |  | 21 | 25 |
| Hydroxypropyl methacrylate |  |  |  |  |  |
| Hydroxypropyl acrylate |  |  |  |  |  |
| Acrylic acid | 2 | 2 | 2 | 2 | 2 |
| Mw | 4000 | 18000 | 18000 | 9000 | 18000 |
| Hydroxyl value | 170 | 99 | 43 | 192 | 121 |
| $C_6$-$C_{18}$ monoalkyl (meth)-acrylate content (%) | 30 | 17 | 30 | 26 | 65 |

Synthesis of (B) (3) components

Synthesis Example 9 (Synthesis of acrylic resin dispersion B3-a)

Butyl alcohol (70 parts) was heated and refluxed. Thereto was added the following monomer-initiator mixture dropwise over 3 hours:

| Styrene | 15 parts |
|---|---|
| 2-Ethylhexyl methacrylate | 50 parts |
| n-Butyl methacrylate | 13 parts |
| 2-Hydroxyethyl methacrylate | 19 parts |
| Methacrylic acid | 7 parts |
| $\alpha,\alpha'$-Azobisisobutyronitrile | 2 parts |

Thirty minutes after completion of the dropping, a mixture of 1 part of t-butyl peroctoate and 30 parts of n-butanol was added dropwise over 1 hour, and then reacted under reflux of the solvent for additional 5 hours.

The acrylic resin solution obtained had a solid content of 50%.

Then, to 203 parts of the resin solution, there were added 1 part of glycidyl methacrylate, 0.02 part of 4-t-butylpyrocatechol and 0.1 part of dimethylaminoethanol, and the reaction was carried out under reflux condition for 5 hours in order to introduce copolymerizable double bonds. A flask was charged with 50 parts of the above product and 100 parts of ethylcyclohexane and, under reflux condition, the following monomer-initiator mixture was added cropwise over 4 hours:

| Styrene | 13 parts |
|---|---|
| Methyl methacrylate | 45 parts |
| n-Butyl methacrylate | 10 parts |
| Acrylonitrile | 20 parts |
| Glycidyl methacrylate | 10 parts |
| Methacrylic acid | 2 parts |
| $\alpha,\alpha'$-Azobisisobutyronitrile | 1 part |

Then, 0.2 part of t-butyl peroctoate was further added, and then further reacted for 3 hours to give the desired acrylic resin dispersion B3-a.

The dispersion was a milk-white dispersion having a solid content of 50%.

Synthesis Example 10 (Synthesis of acrylic polyol resin solution B3-b)

A conventional reaction vessel for acrylic resin-production, equipped with a stirrer, a thermometer, a reflux condenser and so on, was charged with 50 parts of Swazol 1000 and 15 parts of n-butanol. The contents were heated with stirring and, after the temperature reached 132° C., the following monomer mixture was added over 3 hours:

| Styrene | 20 parts |
|---|---|
| n-Butyl methacrylate | 35 parts |
| Lauryl methacrylate | 15 parts |
| 2-Hydroxyethyl methacrylate | 28 parts |
| Acrylic acid | 2 parts |
| $\alpha,\alpha'$-Azobisisobutyronitrile | 3 parts |

One hour after completion of the addition of the above monomer mixture, a mixture of 1 part of t-butyl peroctoate and 10 parts of Swazol 1000 was added over 1 hour. Thereafter, stirring was continued for 2 hours while the temperature was maintained at 132° C. The reaction mixture was then cooled and thereto Swazol 1000 was added to give the desired acrylic polyol resin solution B3-b having a solid content of 50%. This acrylic resin had an $\overline{M}w$ value of 18,000 and a hydroxyl value of 121.

Synthesis Examples 11 and 12 and Comparative Synthesis

Examples 9 and 10 (Synthesis of acrylic polyol resin solutions B3-c to B3-f)

Acrylic polyol resin solutions B3-c to B3-f were produced in the same manner as in Synthesis Example 10. All the solutions had a solid content within the range of 49.0–51.1%. The composition, $\overline{M}w$ and hydroxyl value of each of the acrylic polyol resins B3-c to B3-f thus obtained are shown below in Table 2.

TABLE 2

|  | Synthesis Example | | | Comparative Synthesis Example | |
|---|---|---|---|---|---|
|  | 10 | 11 | 12 | 9 | 10 |
| Acrylic polyol resin | B3-b | B3-c | B3-d | B3-e | B3-f |
| Styrene | 20 |  | 30 |  | 20 |
| n-Butyl methacrylate | 35 | 37 | 37 | 37 | 58 |
| Isobutyl methacrylate |  | 30 |  | 30 |  |
| 2-Ethylhexyl methacrylate |  |  | 15 |  |  |
| Lauryl methacrylate | 15 |  |  |  | 10 |
| 2-Hydroxyethyl methacrylate | 28 |  |  |  | 10 |
| 2-Hydroxyethyl acrylate |  | 31 | 16 | 31 |  |
| Acrylic resin | 2 | 2 | 2 | 2 | 2 |
| Mw | 18000 | 9000 | 30000 | 4000 | 18000 |
| Hydroxyl value (mg KOH/g) | 121 | 15 | 72 | 150 | 40 |

Production of polyol-based diurea rheology modifiers

Preparation Example 1 (Production of Aa-based diurea)

A flask was charged with 112.5 parts (90 parts as solids) of the 80% polyol solution Aa obtained in Production Example 1. Thereto were added with stirring at room temperature 2.6 parts of n-propylamine and 7.4 parts of hexamethylene diisocyanate. Stirring of the mixture gave an Aa-based diurea composition (polyol/diurea solids ratio=90/10).

Preparation Examples 2–9 (Production of Ab- to Ai-based diureas)

Polyol-based diurea compositions each based on the polyols Ab to Ai (polyol/diurea=90/10) were obtained in the same manner as in Preparation Example 1 except that the polyol solutions Ab to Ai were respectively used in an amount corresponding to 90 parts of solids in place of 112.5 parts of the 80% polyol solution Aa used in Preparation Example 1.

[2] Preparation of top coat paint compositions

Formulation Examples 1–42 and Comparative Formulation Examples 1–35

Top coat paint compositions each having the components shown below in Table 3 to Table 8 were prepared using the samples obtained in the above-mentioned Production Examples, Synthesis Examples and Preparation Examples.

In Tables 3–8, the diurea amount means the amount of diurea alone in each polyol-based diurea (polyol/diurea=90/10); the polyol amounts given in Table 3 to Table 8 for (A) components each is the sum of the amount of polyol in the polyol-based diurea and the amount of the other (A) component proper. The amounts given in Table 3 to Table 8 are on the nonvolatile matter or effective ingredient basis.

Table 3 covers Formulation Examples 1–14, while Table 4 covers Comparative Formulation Examples 1–11. The formulations given in Table 3 and Table 4 are top coat enamel paint compositions. Pigment dispersion was performed in a batch sand mill using the (B) components in the respective paint formulations as dispersion medium resins.

Table 5 covers Formulation Examples 15–28, Table 6 covers Comparative Formulation Examples 12–24, Table 7 covers Formulation Examples 29–42 and Table 8 covers Comparative Formulation Examples 25–35.

The compositions of Formulation Examples 15–42 and Comparative Formulation Examples 12–35 are top coat clear paint compositions. Prior to their use in coating, they were adjusted to a viscosity of about 30 seconds (Ford cup No. 4/20° C.) with a mixed solvent composed of xylene, 2-ethoxyethyl acetate and n-butanol (40/50/10).

TABLE 3

| | | | Formulation Example | | | | | | |
|---|---|---|---|---|---|---|---|---|---|
| | | | 1 | 2 | 3 | 4 | 5 | 6 | 7 |
| Composition | (A) Component polyol | Type Amount | Aa 30 | Ab 30 | Ac 30 | Ad 30 | Ae 30 | Aa 30 | Aa Ac 9 21 |
| | (B) (1) Component polyester resin | Type Amount | B1-a 40 | B1-a 40 | B1-a 40 | B1-a 40 | B1-a 40 | B1-b 40 | B1-b 40 |
| | (C) Component melamine (Note 2) | Type Amount | cy-235 30 | cy-235 30 | cy-235 30 | cy-235 30 | cy-235 30 | cy-235 30 | cy-235 30 |
| | Diurea | (PHR) | 1 | 1 | 1 | 1 | 1 | 1 | 1 |
| | Dodecylbenzenesulfonic acid | (PHR) | 3 | 3 | 3 | 3 | 3 | 3 | 3 |
| | Black pigment | (Note 1) | 1 | 1 | 1 | 1 | 1 | 1 | 1 |

| Formulation Example | | | | | | | | |
|---|---|---|---|---|---|---|---|---|
| | | | 8 | 9 | 10 | 11 | 12 | 13 | 14 |
| Composition | (A) Component polyol | Type Amount | Ac 30 | Aa 25 | Aa 30 | Aa 20 | Ac 40 | Ac 50 | Ac 30 |
| | (B) (1) Component polyester resin | Type Amount | B1-c 40 | B1-a 40 | B1-a 45 | B1-a 50 | B1-a 30 | B1-a 20 | B1-a 40 |
| | (C) Component melamine (Note 2) | Type Amount | cy-235 30 | cy-303 35 | cy-327 25 | cy-235 30 | cy-235 30 | cy-235 30 | cy-235 30 |
| | Diurea | (PHR) | 1 | 1 | 1 | 1 | 1 | 1 | 0 |
| | Dodecylbenzenesulfonic acid | (PHR) | 3 | 3 | 3 | 3 | 3 | 3 | 3 |
| | Black pigment | (Note 1) | 1 | 1 | 1 | 1 | 1 | 1 | 1 |

(Note 1)
Mitsubishi Carbon black MA-100 (Mitsubishi Chemical Industries, Ltd.)
(Note 2)
cy-235: Mitsui Toatsu Chemicals, Inc.; methyl/butyl mixed etherified melamine resin, Cymel-235.
cy-303: Mitsui Toatsu Chemicals, Inc.; methyl/butyl etherified melamine resin, Cymel-303.
cy-327: Mitsui Toatsu Chemicals, Inc.; methyl/butyl etherified melamine resin, Cymel-327.

TABLE 4

| | | | Comparative Formulation Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Composition | (A) Component | Type Amount | Af 30 | Ag 30 | Ah 30 | Ai 30 | Aa 30 | Aa 30 | Ac 30 | Aa 10 | Ac 65 | Ac 30 | Ac 30 |
| | (B) (1) Component | Type Amount | B1-a 40 | B1-a 40 | B1-a 40 | B1-a 40 | B1-d 40 | B1-e 40 | B1-f 40 | B1-a 60 | B1-a 5 | B1-a 40 | B1-a 40 |
| | (C) Component | Type | cy-235 | cy-235 | cy-235 | cy-235 | cy-235 | cy-235 | cy-235 | cy-235 | cy-235 | L-127-75B (Note 3) | L-127-75B (Note 3) |
| | | Amount | 30 | 30 | 30 | 30 | 30 | 30 | 30 | 30 | 30 | 30 | 30 |
| | Diurea | (PHR) | 1 | 1 | 1 | 1 | 1 | 1 | 1 | 1 | 1 | 1 | 1 |
| | Dodecylbenzenesulfonic acid | (PHR) | 3 | 3 | 3 | 3 | 3 | 3 | 3 | 3 | 3 | 3 | 0 |
| | Black pigment | (Note 1) | 1 | 1 | 1 | 1 | 1 | 1 | 1 | 1 | 1 | 1 | 1 |

(Note 3)
L-127-75B: Dainippon Ink and Chemicals, Inc.; butylated melamine resin, average degree of concentration ca. 3.0.

TABLE 5

| | Formulation Example | | 15 | 16 | 17 | 18 | 19 | 20 | 21 |
|---|---|---|---|---|---|---|---|---|---|
| Composition | (A) Component | Type | Aa | Ab | Ac | Ad | Ae | Aa | Aa  Ac |
| | | Amount | 30 | 30 | 30 | 30 | 30 | 30 | 9  21 |
| | (B) (2) Component | Type | B2-a | B2-a | B2-c | B2-a | B2-a | B2-b | B2-d |
| | | Amount | 40 | 40 | 40 | 40 | 40 | 40 | 40 |
| | (C) Component | Type | cy-235 | cy-235 | cy-235 | cy-235 | cy-235 | cy-235 | cy-235 |
| | | Amount | 30 | 30 | 30 | 30 | 30 | 30 | 30 |
| | Diurea | (PHR) | 1 | 1 | 1 | 1 | 1 | 1 | 1 |
| | Dodecylbenzenesulfonic acid | (PHR) | 3 | 3 | 3 | 3 | 3 | 3 | 3 |

| | Formulation Example | | 22 | 23 | 24 | 25 | 26 | 27 | 28 |
|---|---|---|---|---|---|---|---|---|---|
| Composition | (A) Component | Type | Ac | Aa | Ac | Ac | Ac | Ac | Ac |
| | | Amount | 30 | 25 | 30 | 20 | 40 | 50 | 30 |
| | (B) (2) Component | Type | B2-e | B2-a | B2-a | B2-a | B2-a | B2-a | B2-a |
| | | Amount | 40 | 40 | 45 | 50 | 30 | 20 | 40 |
| | (C) Component | Type | cy-235 | cy-303 | cy-327 | cy-235 | cy-235 | cy-235 | cy-235 |
| | | Amount | 30 | 35 | 25 | 30 | 30 | 30 | 30 |
| | Diurea | (PHR) | 1 | 1 | 1 | 1 | 1 | 1 | 0 |
| | Dodecylbenzenesulfonic acid | (PHR) | 3 | 3 | 3 | 3 | 3 | 3 | 3 |

TABLE 6

| | Comparative Formulation Example | | 12 | 13 | 14 | 15 | 16 | 17 | 18 |
|---|---|---|---|---|---|---|---|---|---|
| Composition | (A) Component | Type | Af | Ag | Ah | Ai | Aa | Aa | Ac |
| | | Amount | 30 | 30 | 30 | 30 | 30 | 30 | 30 |
| | (B) (2) Component | Type | B2-a | B2-a | B2-a | B2-a | B2-f | B2-g | B2-h |
| | | Amount | 40 | 40 | 40 | 40 | 40 | 40 | 40 |
| | (C) Component | Type | cy-235 | cy-235 | cy-235 | cy-235 | cy-235 | cy-235 | cy-235 |
| | | Amount | 30 | 30 | 30 | 30 | 30 | 30 | 30 |
| | Diurea | (PHR) | 1 | 1 | 1 | 1 | 1 | 1 | 1 |
| | Dodecylbenzenesulfonic acid | (PHR) | 3 | 3 | 3 | 3 | 3 | 3 | 3 |

| | Comparative Formulation Example | | 19 | 20 | 21 | 22 | 23 | 24 |
|---|---|---|---|---|---|---|---|---|
| Composition | (A) Component | Type | Aa | Ac | Ac | Ac | Ac | Ac |
| | | Amount | 30 | 30 | 10 | 65 | 30 | 30 |
| | (B) (2) Component | Type | B2-i | B2-j | B2-a | B2-a | B2-a | B2-a |
| | | Amount | 40 | 40 | 60 | 5 | 40 | 40 |
| | (C) Component | Type | cy-235 | cy-235 | cy-235 | cy-235 | L-127-75B | L-127-75B |
| | | Amount | 30 | 30 | 30 | 30 | 30 | 30 |
| | Diura | (PHR) | 1 | 1 | 1 | 1 | 1 | 1 |
| | Dodecylbenzenesulfonic acid | (PHR) | 3 | 3 | 3 | 3 | 3 | 3 |

TABLE 7

| Formulation Example | | | 29 | 30 | 31 | 32 | 33 | 34 | 35 |
|---|---|---|---|---|---|---|---|---|---|
| Composition | (A) Component | Type | Aa | Ab | Ac | Ad | Ae | Aa | Ac |
| | | Amount | 30 | 30 | 30 | 30 | 20 | 30 | 30 |
| | (B) Component | Type | B3-a | B3-a | B3-a | B3-a | B3-a | B3-a | B3-a |
| | | Amount | 25 | 25 | 25 | 25 | 15 | 25 | 25 |
| | | Type | B3-b | B3-b | B3-b | B3-b | B3-b | B3-c | B3-d |
| | | Amount | 15 | 15 | 15 | 15 | 40 | 15 | 15 |
| | (C) Component | Type | cy-235 | cy-235 | cy-303 | ct-235 | cy-235 | cy-235 | cy-235 |
| | | Amount | 30 | 30 | 30 | 30 | 25 | 30 | 30 |
| | Diurea | (PHR) | 1 | 1 | 1 | 1 | 1 | 1 | 1 |
| | Dodecylbenzenesulfonic acid | (PHR) | 3 | 3 | 3 | 3 | 3 | 3 | 3 |

| Formulation Example | | | 36 | 37 | 38 | 39 | 40 | 41 | 42 |
|---|---|---|---|---|---|---|---|---|---|
| Composition | (A) Component | Type | Aa | Ac | Aa Ac | Ac | Ac | Ac | Ac |
| | | Amount | 25 | 25 | 9  11 | 45 | 20 | 20 | 30 |
| | (B) Component | Type | B3-a | B3-a | B3-a | B3-a | B3-a | B3-a | B3-a |
| | | Amount | 25 | 25 | 25 | 23 | 15 | 48 | 25 |
| | | Type | B3-b | B3-b | B3-b | B3-b | B3-b | B3-b | B3-b |
| | | Amount | 10 | 30 | 25 | 7 | 25 | 7 | 15 |
| | (C) Component | Type | cy-235 | cy-235 | cy-235 | cy-327 | cy-235 | cy-235 | cy-235 |
| | | Amount | 40 | 20 | 30 | 25 | 40 | 25 | 30 |
| | Diurea | (PHR) | 1 | 1 | 1 | 1 | 1 | 1 | 0 |
| | Dodecylebenzenesulfonic acid | (PHR) | 3 | 3 | 3 | 3 | 3 | 3 | 3 |

TABLE 8

| Comparative Formulation Example | | | 25 | 26 | 27 | 28 | 29 | 30 | 31 | 32 | 33 | 34 | 35 |
|---|---|---|---|---|---|---|---|---|---|---|---|---|---|
| Composition | (A) Component | Type | Af | Ag | Ah | Ai | Ac | Ac | Ac | Ac | Ac | Ac | Ac |
| | | Amount | 30 | 30 | 30 | 30 | 30 | 30 | 30 | 10 | 56 | 30 | 30 |
| | (B) Component | Type | B3-a | B3-a | B3-a | B3-a | B3-a | B3-a | B3-a | B3-a | B3-a | B3-a | B3-a |
| | | Amount | 25 | 25 | 25 | 25 | 25 | 25 | 5 | 25 | 15 | 25 | 25 |
| | | Type | B3-b | B3-b | B3-b | B3-b | B3-e | B3-f | B3-b | B3-b | B3-b | B3-b | |
| | | Amount | 15 | 15 | 15 | 15 | 15 | 15 | 35 | 35 | 4 | 15 | 15 |
| | (C) Component | Type | cy-235 | cy-235 | cy-235 | cy-235 | cy-235 | cy-235 | cy-235 | cy-235 | cy-235 | L-127-75B | |
| | | Amount | 30 | 30 | 30 | 30 | 30 | 30 | 30 | 30 | 25 | 30 | |
| | Diurea | (PHR) | 1 | 1 | 1 | 1 | 1 | 1 | 1 | 1 | 1 | 1 | 1 |
| | Dodecyl-benzenesulfonic acid | (PHR) | 3 | 3 | 3 | 3 | 3 | 3 | 3 | 3 | 3 | 3 | 3 |

[3] Production of base coat compositions

Production of base coat composition a

Styrene (15 parts), 20 parts of methyl methacrylate, 30 parts of ethyl acrylate, 21 parts of n-butyl methacrylate, 12 parts of 2-hydroxyethyl methacrylate and 2 parts of acrylic acid were polymerized in xylene using $\alpha,\alpha'$-azobisisobutyronitrile as a polymerization initiator to give an acrylic resin solution having a resin content of 50% and a varnish viscosity of $Z_1$. This acrylic resin solution was used to prepare solution-type base coat composition a according to the following formulation:

| | |
|---|---|
| 50% Acrylic resin solution mentioned above | 160 parts |
| 60% Uban 20SE (Note 4) | 33 parts |
| Alpaste No. 4919 (Note 5) | 1 part |
| Stapa Mobil 801 (Note 6) | 1 part |
| Carbon black (Note 7) | 1.0 part |

(Note 4)
Butylated melamine resin manufactured by Mitsui Toatsu Chemicals, Inc.
(Note 5)
Alminium paste produced by Toyo Aluminium K.K.
(Note 6)
Alminium paste produced by Eckart-Werke
(Note 7)
Trade name "Neo Specta Beads AG", produced by Columbian Carbon, Co., Ltd.

This base coat composition was adjusted to a viscosity of 14 seconds (Ford cup No. 4/20° C.) with a mixed solvent composed of 40 parts of toluene, 30 parts of Swazol 1000 (Cosmo Oil Company), 20 parts of butyl acetate and 10 parts of n-butanol and subjected to painting.

Production of base coat composition b

An acrylic resin solution having a resin content of 50% and a varnish viscosity of $Z_3$ was prepared by polymerizing 44 parts of methyl methacrylate, 44 parts of ethyl acrylate, 10 parts of 2-hydroxyethyl methacrylate and 2 parts of acrylic acid in xylene in the presence of $\alpha,\alpha'$-azobisisobutyronitrile as a polymerization initiator. Solution-type base coat composition be was prepared by using this acrylic resin solution in accordance with the following formulation:

| | |
|---|---|
| 50% Acrylic resin solution mentioned above | 160 parts |
| 60% Uban 28SE (Note 8) | 33 parts |
| Alpaste No. 4919 (Note 5) | 1 part |
| Stapa Mobil 801 (Note 6) | 1 part |
| Carbon black (Note 7) | 1.0 part |

(Note 8) Butylated melamine resin produced by Mitsui Toatsu Chemicals, Inc.

The above base coat composition was adjusted to a viscosity of 14 seconds (For cup No. 4/20° C.) with a mixed solvent composed of 40 parts of toluene, 30 parts of Swazol 1000, 20 parts of butyl acetate and 10 parts of n-butanol and used for coat purposes.

Production of base coat composition c

Acrylic resin solution c-1 having a resin content of 70% was prepared by polymerizing 15 parts of styrene, 15 parts of methyl methacrylate, 49 parts of ethyl acrylate, 20 parts of hydroxyethyl acrylate and 1 part of acrylic acid in xylene in the presence of $\alpha,\alpha'$-azobisisobutyronitrile as a polymerization initiator.

Nonaqueous acrylic resin dispersion c-2 with a resin content of 50% was prepared by dispersion polymerizing 70 parts of vinyl monomers (mixture composed of 30 parts of styrene, 30 parts of methyl methacrylate, 23 parts of 2-ethylhexyl acrylate, 15 parts of 2-hydroxyethyl acrylate and 2 parts of acrylic acid) in n-heptane by a conventional metnod in the presence, as a dispersion stabilizer, of a copolymer of 30 parts of poly-12-hydroxystearic acid-glycidyl methacrylate adduct, 10 parts of styrene, 20 parts of methyl methacrylate, 17 parts of 2-ethylhexyl meth-acrylate, 20 parts of 2-hydroxyethyl methacrylate and 3 parts of acrylic acid.

The acrylic resin solution c-1 and the acrylic resin dispersion c-2 each obtained in the above manner were used to prepare base coat composition c according to the following formulation:

| | |
|---|---|
| Acrylic resin solution c-1 | 29 parts |
| Nonaqueous acrylic resin dispersion c-2 | 120 parts |
| 88% Cymel 370 (Note 9) | 23 parts |
| Alpaste No. 4919 (Note 5) | 1 part |
| Alpaste No. 55-519 (Note 10) | 2 parts |
| Carbon black (Note 7) | 1.0 part |

(Note 9) Methyletherified melamine resin produced by Mitsui Toatsu Chemicals, Inc.
(Note 10) Aluminium paste produced by Toyo Aluminium K. K.

The above base coat composition c was adjusted to a viscosity of 15 seconds (Ford cup No. 4/20° C.) with a mixed solvent composed of 30 parts of n-heptane, 30 parts of xylene, 30 parts of Swazol 1000 and 10 parts of ethylene glycol monobutyl ether and used for coat purposes.

[4] Application of top coat compositions

Preparation of materials for testing

An epoxy-type cationic electrodeposition paint was electrodeposited on zinc phosphate-conversion treated dull steel sheets having a thickness of 0.8 mm to give a dry paint film thickness of about 20μ. The paint film was baked at 170° C. for 20 minutes, sanded with a No. 400 sandpaper, degreased by wiping with petroleum benzine and air spray-coated with an intermediate coating surfacer for automobiles to give a dry film thickness of about 25μ. The surface film was baked at 140° C. for 30 minutes, wet-sanded with a No. 400 sandpaper, drained and dried, and degreased with petroleum benzine. Thus were prepared mterials for testing.

Application Examples 1-14 and Comparative Application

Examples 1-11

Using the paint compositions given in Table 3 and Table 4 (Formulation Examples 1-14 and Comparative Formulation Examples 1-11) which were adjusted to a viscosity of 25-35 seconds (Ford cup No. 4/20° C.) with a mixed solvent composed of xylene, 2-ethoxyethyl acetate and n-butanol (40/50/10), the above materials for testing were air-sprayed by means of a Wider W71 air spray gun (Iwata Tosoki Kogyo) to give a dry film thickness of 28-32μ. After setting at room temperature for 10 minutes, the films were cured by baking in an electric oven at 140° C. for 30 minutes.

The results of testing of the cure films for peformance characteristics are shown in Table 9 and Table 10.

Application Example 15

The base coat composition adjusted to a viscosity of 14 seconds was applied to the above-mentioned materials for testing by means of an F5 air spray gun (Meiji Kikai Seisakusho) to give a dry film thickness of about 15μ. The coated materials were allowed to stand at room temperature for 3 minutes and then coated with the acrylic top coat paint of Formulation Example 15 (adjusted to a viscosity of about 30 seconds) by means of an F5 air spray gun to a dry film thickness of about 30μ. The coated materials were allowed to stand at room temperature for 10 minutes for setting. Then, the films were hardened by baking in an electric hot air drier at 140° C. for 30 minutes. The test results of the coated sheets obtained are shown in Table 11.

Application Examples 16-50 and Comparative Application

Examples 12-35

Coated sheets were prepared in the same manner as in Application Example 15 except that the kinds of base coat and top coat paint specified in Tables 11-14 were used. The test results obtained in Application Examples 15-32 are shown in Table 11, those obtained in Comparative Application Examples 12-24 are shown in Table 12, those obtained in Application Examples 33-50 are shown in Table 13, and those obtained in Comparative Application Examples 24-35 are shown in Table 14.

The characteristics listed in Tables 9-14 were evaluated by the following methods:

(Note 11): Appearance of film

The evaluation of finished film appearance was performed in terms of sense of gloss and sense of solidness or building-up on the following scoring scale:
5: Very good
4: Good
3: Fair
2: Poor
1: Very poor (Note 12): Measurement of image sharpness The measurement was performed using a model JCRI-GGD-166 apparatus Gd system (provided from Japan Color Research Institute), with the measurement angle fixedly set to 55°.

(Note 13): Scratch resistance

An automobile with coated test specimen sheets adhered to the roof thereof was washed 15 times by means of a car washer (Yasui Sangyo model PO20 FWRC) and the paint film surfaces were observed and evaluated according to the following criteria:
4: Macroscopic observation reveals almost no scratches; acceptable in scratch resistance.
3: A few scratches can be found but they are very slight ones.
2: Macroscopic observation reveals a considerable number of scratches; unsatisfactory in scratch resistance.
1: Macroscopic observation reveals distinct and serious scratches; unsatisfactory.

(Note 14): Impact resistance

The test was performed on a du Pont impact tester. The impace rod head diameter was ½ inch, and a 500-g falling weight was used. The impact resistance is expressed in terms of the maximum height (at 5-cm intervals) causing no cracking in the paint film.

(Note 15): Water resistance

Test specimens were immersed in a constant-temperature water bath (40° C.) for 240 hours, then taken out and observed. The symbol o indicates that the paint film in question was free of abnormalities (e.g., loss in gloss, blister, swelling, etc.).

(Note 16): Gasoline-wipe resistance

A gauze was moistened with Silver gasoline (Nippon Oil Company) and the paint film surface was wiped intensely with the gauze over a length of 10 cm 8 times both ways and then observed. The symbol o means that the paint film surface had few scratches and showed little loss in gloss.

(Note 17): Acid resistance

A 0.5-cc portion of 10% sulfuric acid was spotted on the paint film surface. After 48 hours of standing at 20° C. and 75% RH, the paint film surface was washed with water and observed. The symbol o indicates that no damage were found.

(Note 18): Weather resistance

Coated sheets were subjected to testing in a sunshine weather meter for 1,200 hours, then washed with water, and evaluated in terms of 60° gloss retention percentage on the following scoring scale:
4: Not less than 81%
3: 75-80%
2: 70-74%
1: Not more than 60%

(Note 19): Critical antisagging thickness

A steel plate, 45 cm in length and 25 cm in width, was subjected to electrodeposition and intermediate coating, and followed by baking. The paint to be tested was then applied to the steel plate by means of a spray gun in a manner such that the paint film thickness (after hardening) varies continuously from 10μ to 60μ longitudinally from left to right. Prior to paint application, a paper tape (1 inch wide) was adhered to the steel plate intermediate-coated at full length in the lengthwise direction at a position ⅓ of the width. After paint application, said tape was peeled off. The steel plate was held vertical, allowed to stand in that condition for 5 minutes and then subjected, still in that condition, to baking. The maximum paint film thickness at which no sagging had occurred was regarded as the critical antisagging thickness.

TABLE 9

| Test Item | Application Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Top coat (Formulation Example) | 1 | 2 | 3 | 4 | 5 | 6 | 7 | 8 | 9 | 10 | 11 | 12 | 13 | 14 |
| Appearance of film (Note 11) | 5 | 5 | 5 | 5 | 5 | 5 | 5 | 5 | 5 | 5 | 5 | 5 | 5 | 5 |
| Gloss (60°) | 98 | 97 | 98 | 98 | 98 | 96 | 98 | 99 | 98 | 98 | 97 | 97 | 98 | 98 |
| Mirror value (Note 12) | 0.9 | 0.9 | 0.9 | 0.9 | 0.9 | 0.9 | 0.9 | 0.9 | 0.9 | 0.9 | 0.9 | 0.9 | 0.9 | 0.9 |
| Pencil hardness | H | H | H | H | H | H | H | H | H | H | H | H | H | H |
| Scratch resistance (Note 13) | 4 | 3 | 4 | 4 | 3 | 4 | 4 | 4 | 4 | 4 | 3 | 4 | 3 | 4 |
| Impact resistance (cm) (Note 14) | 30 | 30 | 35 | 35 | 30 | 30 | 35 | 35 | 30 | 30 | 30 | 30 | 30 | 35 |
| Water resistance (Note 15) | o | o | o | o | o | o | o | o | o | o | o | o | o | o |
| Gasoline-wipe resistance (Note 16) | o | o | o | o | o | o | o | o | o | o | o | o | o | o |
| Acid resistance (Note 17) | o | o | o | o | o | o | o | o | o | o | o | o | o | o |
| Weather resistance (Note 18) | 4 | 4 | 4 | 4 | 4 | 4 | 4 | 4 | 4 | 4 | 4 | 4 | 4 | 4 |
| Critical antisagging thickness (μ) (Note 19) | 45 | 46 | 40 | 47 | 43 | 44 | 46 | 45 | 45 | 47 | 44 | 45 | 46 | 20 |

TABLE 10

| Test item | Comparative Application Example | | | | | | | | | | |
|---|---|---|---|---|---|---|---|---|---|---|---|
| | 1 | 2 | 3 | 4 | 5 | 6 | 7 | 8 | 9 | 10 | 11 |
| Top coat (Comparative Example of Formulation) | 1 | 2 | 3 | 4 | 5 | 6 | 7 | 8 | 9 | 10 | 11 |
| Appearance of film (Note 11) | 5 | 5 | 5 | 5 | 4 | 5 | 5 | 5 | 3 | 2 | 5 |
| Gloss (60°) | 96 | 96 | 95 | 94 | 94 | 95 | 96 | 95 | 90 | 88 | 95 |
| Mirror value (Note 12) | 0.9 | 0.9 | 0.8 | 0.8 | 0.8 | 0.9 | 0.9 | 0.8 | 0.7 | 0.4 | 0.9 |
| Pencil hardness | H | H | H | H | H | H | F | H | H | H | HB |
| Scratch resistance (Note 13) | 2 | 2 | 2 | 1 | 2 | 3 | 1 | 1 | 4 | 1 | 1 |
| Impact resistance (cm) (Note 14) | 30 | 30 | 30 | 30 | 30 | 30 | 30 | 30 | 15 | 10 | 35 |
| Water resistance (Note 15) | o | o | o | o | o | o | Blister | o | Blister | Blister | Blister |
| Gasoline-wipe resistance (Note 16) | o | o | o | o | o | o | Loss of gloss | o | o | o | Loss of gloss |
| Acid resistance (Note 17) | o | o | o | o | o | Blister | o | o | Swelling, blister | Swelling, dissolution | Blister |
| Weather resistance (Note 18) | 4 | 4 | 4 | 3 | 3 | 2 | 2 | 4 | 2 | 1 | 3 |
| Critical antisagging thickness (μ) (Note 19) | 42 | 44 | 45 | 42 | 43 | 42 | 45 | 45 | 38 | 48 | 48 |

TABLE 11

| Test item | Application Example | | | | | | | | | | | | | | | | | |
|---|---|---|---|---|---|---|---|---|---|---|---|---|---|---|---|---|---|---|
| | 15 | 16 | 17 | 18 | 19 | 20 | 21 | 22 | 23 | 24 | 25 | 26 | 27 | 28 | 29 | 30 | 31 | 32 |
| Appearance of film (Note 11) | 5 | 5 | 5 | 5 | 5 | 5 | 5 | 5 | 5 | 5 | 5 | 5 | 5 | 5 | 5 | 5 | 5 | 5 |
| Gloss (60°) | 99 | 98 | 99 | 99 | 98 | 99 | 98 | 99 | 99 | 98 | 99 | 98 | 98 | 98 | 99 | 98 | 98 | 99 |
| Mirror value (Note 12) | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Pencil hardness | F | F | F | F | F | F | F | F | F | F | F | F | F | F | F | F | F | F |
| Scratch resistance (Note 13) | 4 | 4 | 4 | 4 | 4 | 4 | 4 | 4 | 4 | 3 | 4 | 4 | 4 | 4 | 4 | 4 | 4 | 4 |
| Impact resistance (cm) (Note 14) | 30 | 30 | 35 | 30 | 30 | 30 | 30 | 30 | 30 | 35 | 35 | 30 | 25 | 30 | 30 | 30 | 30 | 30 |
| Water resistance (Note 15) | o | o | o | o | o | o | o | o | o | o | o | o | o | o | o | o | o | o |
| Gasoline-wipe resistance (Note 16) | o | o | o | o | o | o | o | o | o | o | o | o | o | o | o | o | o | o |
| Acid resistance (Note 17) | o | o | o | o | o | o | o | o | o | o | o | o | o | o | o | o | o | o |
| Weather resistance (Note 18) | 4 | 4 | 4 | 4 | 4 | 4 | 4 | 4 | 4 | 4 | 4 | 4 | 4 | 4 | 4 | 4 | 4 | 4 |
| Critical antisagging thickness (μ) (Note 19) | 55 | 56 | 55 | 55 | 57 | 58 | 57 | 55 | 56 | 57 | 56 | 57 | 58 | 40 | 57 | 58 | 57 | 58 |
| Coating materials | | | | | | | | | | | | | | | | | | |
| Base coat | a | a | a | a | a | a | a | a | a | a | a | a | a | a | b | b | c | c |
| Clear top coat (Formulation Example) | 15 | 16 | 17 | 18 | 19 | 20 | 21 | 22 | 23 | 24 | 25 | 26 | 27 | 28 | 15 | 17 | 15 | 17 |

TABLE 12

| Test item | Comparative Application Example | | | | | | | | | | | | |
|---|---|---|---|---|---|---|---|---|---|---|---|---|---|
| | 12 | 13 | 14 | 15 | 16 | 17 | 18 | 19 | 20 | 21 | 22 | 23 | 24 |
| Appearance of film (Note 11) | 5 | 5 | 5 | 4 | 4 | 2 | 5 | 2 | 5 | 5 | 1 | 2 | 5 |
| Gloss (60°) | 98 | 99 | 98 | 96 | 99 | 95 | 98 | 94 | 98 | 98 | 85 | 92 | 99 |
| Mirror value (Note 12) | 0.9 | 0.9 | 0.9 | 0.8 | 0.9 | 0.4 | 0.8 | 0.3 | 0.9 | 0.9 | 0.2 | 0.6 | 0.9 |
| Pencil hardness | F | F | F | F | F | F | HB | F | B | F | HB | F | 2B |
| Scratch resistance (Note 13) | 2 | 2 | 2 | 1 | 3 | 4 | 2 | 4 | 2 | 1 | 4 | 1 | 1 |
| Impact resistance (cm) (Note 14) | 30 | 30 | 30 | 30 | 25 | 30 | 30 | 25 | 30 | 30 | 20 | 10 | 30 |
| Water resistance (Note 15) | o | o | o | o | o | o | Blister, Loss of gloss | Blister | Loss of gloss | o | Loss of gloss | Blister, gloss | Loss of |
| Gasoline-wipe resistance (Note 16) | o | o | o | Loss of | o | o | Loss of | o | o | o | o | Good | Loss of |

TABLE 12-continued

| Test item | \multicolumn{12}{c}{Comparative Application Example} |
|---|---|---|---|---|---|---|---|---|---|---|---|---|
| | 12 | 13 | 14 | 15 | 16 | 17 | 18 | 19 | 20 | 21 | 22 | 23 | 24 |
| Acid resistance (Note 17) | o | o | o | gloss o | Blister | o | gloss Blister | gloss Blister | o | o | Blister, swelling | Blister, swelling | Blister, swelling |
| Weather resistance (Note 18) | 4 | 4 | 4 | 4 | 1 | 4 | 2 | 4 | 2 | 4 | 1 | 1 | 1 |
| Critical antisagging thickness (μ) (Note 19) | 57 | 55 | 56 | 56 | 55 | 56 | 59 | 53 | 55 | 57 | 51 | 60 | 55 |
| Coating materials | | | | | | | | | | | | | |
| Base coat | a | a | a | a | a | a | a | a | a | a | a | a | a |
| Clear top coat (Comparative Formulation Example) | 12 | 13 | 14 | 15 | 16 | 17 | 18 | 19 | 20 | 21 | 22 | 12 | 13 |

TABLE 13

| Test item | \multicolumn{18}{c}{Application Example} |
|---|---|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 | 49 | 50 |
| Appearance of film (Note 11) | 5 | 5 | 5 | 5 | 5 | 5 | 5 | 5 | 5 | 5 | 5 | 5 | 5 | 5 | 5 | 5 | 5 | 5 |
| Gloss (60°) | 98 | 98 | 99 | 98 | 98 | 98 | 99 | 99 | 99 | 98 | 98 | 99 | 98 | 99 | 98 | 98 | 99 | 99 |
| Mirror value (Note 12) | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Pencil hardness | F | F | F | F | F | F | F | F | F | F | F | F | F | F | F | F | F | F |
| Scratch resistance (Note 13) | 4 | 4 | 4 | 4 | 4 | 4 | 4 | 4 | 3 | 4 | 4 | 4 | 4 | 4 | 4 | 4 | 4 | 4 |
| Impact resistance (cm) (Note 14) | 30 | 30 | 35 | 30 | 30 | 30 | 30 | 30 | 30 | 30 | 30 | 30 | 30 | 30 | 30 | 30 | 30 | 30 |
| Water resistance (Note 15) | o | o | o | o | o | o | o | o | o | o | o | o | o | o | o | o | o | o |
| Gasoline-wipe resistance (Note 16) | o | o | o | o | o | o | o | o | o | o | o | o | o | o | o | o | o | o |
| Acid resistance (Note 17) | o | o | o | o | o | o | o | o | o | o | o | o | o | o | o | o | o | o |
| Weather resistance (Note 18) | 4 | 4 | 4 | 4 | 4 | 4 | 4 | 4 | 4 | 4 | 4 | 4 | 4 | 4 | 4 | 4 | 4 | 4 |
| Critical antisagging thickness (μ) (Note 19) | 59 | 60 | 58 | 60 | 59 | 60 | 59 | 61 | 59 | 58 | 58 | 59 | 61 | 39 | 60 | 59 | 60 | 60 |
| Coating materials | | | | | | | | | | | | | | | | | | |
| Base coat | a | a | a | a | a | a | a | a | a | a | a | a | a | a | a | a | a | a |
| Clear top coat (Formulation Example) | 29 | 30 | 31 | 32 | 33 | 34 | 35 | 36 | 37 | 38 | 39 | 40 | 41 | 42 | 29 | 31 | 29 | 31 |

TABLE 14

| Test item | \multicolumn{11}{c}{Comparative Application example} |
|---|---|---|---|---|---|---|---|---|---|---|---|
| | 25 | 26 | 27 | 28 | 29 | 30 | 31 | 32 | 33 | 34 | 35 |
| Appearance of film (Note 11) | 5 | 5 | 5 | 4 | 5 | 5 | 1 | 5 | 4 | 4 | 5 |
| Gloss (60°) | 98 | 98 | 98 | 96 | 98 | 99 | 92 | 98 | 96 | 90 | 98 |
| Mirror value (Note 12) | 0.9 | 0.9 | 0.9 | 0.8 | 0.9 | 0.9 | 0.3 | 0.9 | 0.8 | 0.3 | 0.9 |
| Pencil hardness | F | F | F | F | F | F | F | F | F | F | 2B |
| Scratch resistance (Note 13) | 2 | 2 | 2 | 1 | 2 | 1 | 3 | 1 | 4 | 1 | 1 |
| Impact resistance (cm) (Note 14) | 30 | 30 | 30 | 30 | 30 | 35 | 30 | 30 | 15 | 10 | 30 |
| Water resistance (Note 15) | o | o | o | o | o | Blister | o | o | Loss of gloss | Blister | Loss of gloss |
| Gasoline-wipe resistance (Note 16) | o | o | o | Loss of gloss | o | o | o | o | o | o | Loss of gloss |
| Acid resistance (Note 17) | o | o | o | o | Blister, softening | Blister | o | o | Blister, softening | Blister, softening | Blister, softening |
| Weather resistance (Note 18) | 4 | 4 | 4 | 3 | 1 | 2 | 4 | 4 | 1 | 1 | 1 |
| Critical antisagging thickness (μ) (Note 19) | 59 | 58 | 58 | 57 | 56 | 59 | 55 | 57 | 53 | 59 | 56 |
| Coating materials | | | | | | | | | | | |
| Base coat | a | a | a | a | a | a | a | a | a | a | a |
| Clear top coat (Comparative Formulation Example) | 25 | 26 | 27 | 28 | 29 | 30 | 31 | 32 | 33 | 34 | 35 |

What is claimed is:

1. A top coating composition comprising
   (A) a low molecular weight polyol resin selected from the group consisting of a polyester polyol and an acrylic polyol and having a weight average molecular weight as determined by gel permeation chromatography in the range of about 400 to 2,000 with a molecular weight distribution in terms of the ratio of weight average molecular weight ($\overline{M}w$) to number average molecular weight ($\overline{M}n$) of not more than about 1.6, and having a hydroxyl value in the range of about 150 to about 400 mg KOH/g,
   (B) at least one polyol resin selected from the group consisting of
      (1) a polyester polyol having a weight average molecular weight as determined by gel permeation chromatography of about 2,000 to about 50,000, a hydroxyl value of about 50 to about 200 mg KOH/g, and a cyclohexylene ring content of not less than about 7 percent by weight,
      (2) an acrylic polyol resin containing about 20 to about 60 percent by weight of at least one member selected from the group consisting of acrylic and methacrylic esters of a monohydric alcohol of 6 to 18 carbon atoms, and having a weight average molecular weight as determined by gel permeation chromatography of about 5,000 to about 50,000 and a hydroxyl value of about 50 to about 180 mg KOH/g, and (3) a mixed polyol resin consisting of a non-aqueous dispersion type acrylic resin prepared by dispersion-polymerizing at least one vinyl monomer in the presence of a polymer dispersion stabilizer and an organic solvent, and a solution type acrylic polyol resin having a weight average molecular weight as determined by gel permeation chromatography of about 5,000 to about 50,000 and a hydroxyl value of about 50 to about 180 mg KOH/g, and (C) an alkoxy monomeric melamine, wherein the (A) component accounts for about 15 to about 60 percent by weight, the (B) component about 15 to 60 percent by weight, and the (C) component about 20 to about 50 percent by weight based on the total weight of components (A), (B) and (C).

2. The composition according to claim 1 wherein said (A) component is a branched polyester polyol.

3. The composition according to claim 1 wherein said (A) component is a linear polyester polyol.

4. The composition according to claim 1 wherein said (A) component is a ring-opened polyester polyol obtainable by ring-opening polymerization of a lactone compound using a di- or polyhydric alcohol as an initiator.

5. The composition according to claim 1 wherein said (A) component is an acrylic polyol which is a comonomer of a hydroxy group-containing monomer and a monomer copolymerizable therewith.

6. The composition according to claim 1 wherein an alcohol consisting of at least one member selected from the group consisting of a trihydric alcohol and a tetrahydric alcohol accounts for at least about 10 mole percent of the total polyhydric alcohol constituting the (B) (1) polyester polyol resin.

7. The composition according to claim 1 wherein not less than about 50 percent by weight of the cyclohexylene rings in the (B) (1) polyester polyol resin are derived from hexahydroterephthalic acid.

8. The composition according to claim 1 wherein a diurea type rheology modifier obtained by reaction between a primary monoamine and a diisocyanate compound is contained in an effective amount of about 0.1 to about 3 percent by weight based on the total resin non-volatile matter.

* * * * *

UNITED STATES PATENT AND TRADEMARK OFFICE
CERTIFICATE OF CORRECTION

PATENT NO. : 4,960,828

DATED : October 2, 1990

INVENTOR(S) : Tetsuo Higuchi, et al.

It is certified that error appears in the above-identified patent and that said Letters Patent is hereby corrected as shown below:

Title page: item (75), after "Owariasahi" insert --Sonoko Takechi, Toyota; Hiroshi Ito, Ichinomiya; Akira Suganuma, Okazaki--.

Signed and Sealed this

Twelfth Day of May, 1992

Attest:

DOUGLAS B. COMER

*Attesting Officer*  *Acting Commissioner of Patents and Trademarks*